US011923127B2

(12) United States Patent
Zhang et al.

(10) Patent No.: US 11,923,127 B2
(45) Date of Patent: Mar. 5, 2024

(54) METHOD AND DEVICE FOR INSULATION OF HIGH-VOLTAGE GENERATOR TANK

(71) Applicant: SHANGHAI UNITED IMAGING HEALTHCARE CO., LTD., Shanghai (CN)

(72) Inventors: Yunhua Zhang, Shanghai (CN); Jieyong Meng, Shanghai (CN); Qingchang Chen, Shanghai (CN); Yihong Liu, Shanghai (CN); Shilin Shen, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 688 days.

(21) Appl. No.: 17/087,543

(22) Filed: Nov. 2, 2020

(65) Prior Publication Data

US 2021/0050146 A1 Feb. 18, 2021

Related U.S. Application Data

(63) Continuation of application No. 16/266,046, filed on Feb. 2, 2019, now Pat. No. 10,825,603, which is a (Continued)

(30) Foreign Application Priority Data

Jun. 23, 2014 (CN) ......................... 201410283792.8

(51) Int. Cl.

*H01F 27/32* (2006.01)
*H01F 27/02* (2006.01)

(Continued)

(52) U.S. Cl.

CPC ........... *H01F 27/325* (2013.01); *H01F 27/02* (2013.01); *H01F 27/04* (2013.01); *H01F 27/12* (2013.01);

(Continued)

(58) Field of Classification Search

CPC ........ H01F 27/325; H01F 27/02; H01F 27/04; H01F 27/12; H01F 27/14; H01F 27/245;

(Continued)

(56) References Cited

U.S. PATENT DOCUMENTS 3,213,397 A * 10/1965 Broverman ........... H01F 27/325 336/60
3,844,030 A 10/1974 Wilkinson (Continued)

FOREIGN PATENT DOCUMENTS

CN 2110911 U 7/1992
CN 2296592 Y 11/1995

(Continued)

OTHER PUBLICATIONS

First Office Action in Chinese Application No. 201410283792.8 dated Jan. 13, 2016, 10 pages.

(Continued)

*Primary Examiner* — Tuyen T Nguyen
(74) *Attorney, Agent, or Firm* — METIS IP LLC

(57) ABSTRACT

The present disclosure relates to a tank of a high-voltage generator including a tank body and a tank lid. There is an opening in the tank lid. The opening is connected to the bellows so as to counteract the volume change of the transformer oil and avoid generation of bubbles. The tank includes a positive transformer, a negative transformer, a bellows, and other components. The high-voltage winding is embedded in the PCBs. The outer insulating bushing is covered by the PCBs so as to improve the insulativity (Continued)

between the turns of the high-voltage winding. In addition, oil barriers may be placed between the positive and the negative transformers, or between the transformers and the ground so as to eliminate the bridge breakdown effect and make the electric field uniform. By means of said measures, the present disclosure improves the stability of the high-voltage generator.

15 Claims, 9 Drawing Sheets

Related U.S. Application Data continuation of application No. 15/321,820, filed as application No. PCT/CN2015/082086 on Jun. 23, 2015, now Pat. No. 10,340,075.

(51) Int. Cl.
*H01F 27/04* (2006.01)
*H01F 27/12* (2006.01)
*H01F 27/14* (2006.01)
*H01F 27/245* (2006.01)
*H01F 27/28* (2006.01)

(52) U.S. Cl.
CPC ........... *H01F 27/14* (2013.01); *H01F 27/245* (2013.01); *H01F 27/2804* (2013.01); *H01F 27/2823* (2013.01); *H01F 27/324* (2013.01); *H01F 2027/2809* (2013.01); *H01F 27/32* (2013.01)

(58) Field of Classification Search
CPC ............. H01F 27/2804; H01F 27/2823; H01F 27/324; H01F 27/32; H01F 2027/2809; A61B 6/035; A61B 6/56
See application file for complete search history.

(56) References Cited

U.S. PATENT DOCUMENTS

| | | | |
|---|---|---|---|
| 3,902,146 | A | 8/1975 | Muralidharan |
| 4,685,118 | A | 8/1987 | Furbee et al. |
| 5,225,803 | A | 7/1993 | Negle et al. |
| 5,268,955 | A | 12/1993 | Burke et al. |
| 5,709,289 | A | 1/1998 | Peter et al. |
| 5,774,349 | A | 6/1998 | Tichy et al. |
| 5,878,109 | A | 3/1999 | Negle et al. |
| 5,886,610 | A | 3/1999 | Canova |
| 6,212,256 | B1 | 4/2001 | Miesbauer et al. |
| 6,594,341 | B1 | 7/2003 | Lu et al. |
| 8,432,245 | B2 | 4/2013 | Zhang et al. |
| 9,899,142 | B2 | 2/2018 | Zhang et al. |
| 2002/0020547 | A1 | 2/2002 | Negle |
| 2003/0081730 | A1 | 5/2003 | Thandiackal et al. |
| 2003/0099326 | A1 | 5/2003 | Thandiackal et al. |
| 2004/0022360 | A1 | 2/2004 | Price et al. |
| 2005/0041780 | A1 | 2/2005 | Le-Pierrard et al. |
| 2007/0274453 | A1 | 11/2007 | Dittrich et al. |
| 2010/0193160 | A1 | 8/2010 | Jaggi et al. |
| 2011/0050379 | A1 | 3/2011 | Kim |
| 2012/0208386 | A1 | 8/2012 | Beuster et al. |
| 2012/0305289 | A1 | 12/2012 | Jedlitschka |
| 2014/0050305 | A1 | 2/2014 | Zhao et al. |
| 2014/0145813 | A1 | 5/2014 | Zhang et al. |
| 2014/0211923 | A1 | 7/2014 | Chen et al. |
| 2015/0130578 | A1 | 5/2015 | Eom et al. |
| 2016/0093445 | A1 | 3/2016 | Mildner et al. |
| 2017/0178799 | A1 | 6/2017 | Zhang et al. |
| 2017/0274419 | A1 | 9/2017 | Frimpong et al. |

FOREIGN PATENT DOCUMENTS

| | | | |
|---|---|---|---|
| CN | 1115908 | A | 1/1996 |
| CN | 2252392 | Y | 4/1997 |
| CN | 1339541 | A | 3/2002 |
| CN | 2651905 | Y | 10/2004 |
| CN | 2821817 | Y | 9/2006 |
| CN | 2829638 | Y | 10/2006 |
| CN | 201000440 | Y | 1/2008 |
| CN | 201007938 | Y | 1/2008 |
| CN | 201051436 | A | 4/2008 |
| CN | 201112099 | Y | 9/2008 |
| CN | 201147325 | Y | 11/2008 |
| CN | 101753037 | A | 6/2010 |
| CN | 101754559 | A | 6/2010 |
| CN | 101339841 | B | 9/2010 |
| CN | 101847505 | A | 9/2010 |
| CN | 102568762 | A | 7/2012 |
| CN | 102645596 | A | 8/2012 |
| CN | 202565562 | U | 11/2012 |
| CN | 202565563 | U | 11/2012 |
| CN | 103052248 | A | 4/2013 |
| CN | 203072241 | U | 7/2013 |
| CN | 103310948 | A | 9/2013 |
| CN | 203300383 | U | 11/2013 |
| CN | 203377798 | U | 1/2014 |
| CN | 103777585 | A | 5/2014 |
| CN | 203631281 | U | 6/2014 |
| CN | 203764412 | U | 8/2014 |
| CN | 204360885 | U | 5/2015 |
| DE | 2806745 | A1 | 8/1979 |
| DE | 7821220 | U1 | 12/1979 |
| DE | 4213907 | A1 | 11/1993 |
| DE | 19500733 | A1 | 8/1995 |
| DE | 19706550 | A1 | 2/1998 |
| EP | 0564292 | A2 | 10/1993 |
| EP | 1132942 | A2 | 9/2001 |
| FR | 2755797 | A1 | 5/1998 |
| FR | 2815768 | A1 | 4/2002 |
| IN | 1266DEL1999 | A | 8/2008 |
| IN | 1970DEL2007 | A | 8/2008 |
| IN | 1999DE01266 | A | 8/2008 |
| IN | 2007DE01970 | A | 8/2008 |
| JP | S61207174 | A | 9/1986 |
| JP | S6454313 | U | 4/1989 |
| JP | H0757941 | A | 3/1995 |
| WO | 1989010003 | A1 | 10/1989 |
| WO | 2004112055 | A1 | 12/2004 |
| WO | 2008026127 | A2 | 3/2005 |
| WO | 2005107021 | A1 | 11/2005 |
| WO | 2006051474 | A1 | 5/2006 |
| WO | 2007069137 | A2 | 6/2007 |

OTHER PUBLICATIONS

Written Opinion in PCT/CN2015/082086 dated Sep. 9, 2015, 12 pages.
International Search Report in PCT/CN2015/082086 dated Sep. 9, 2015, 8 pages.
The Extended European Search Report in 15812407.3 dated Feb. 13, 2018, 9 Pages.

* cited by examiner

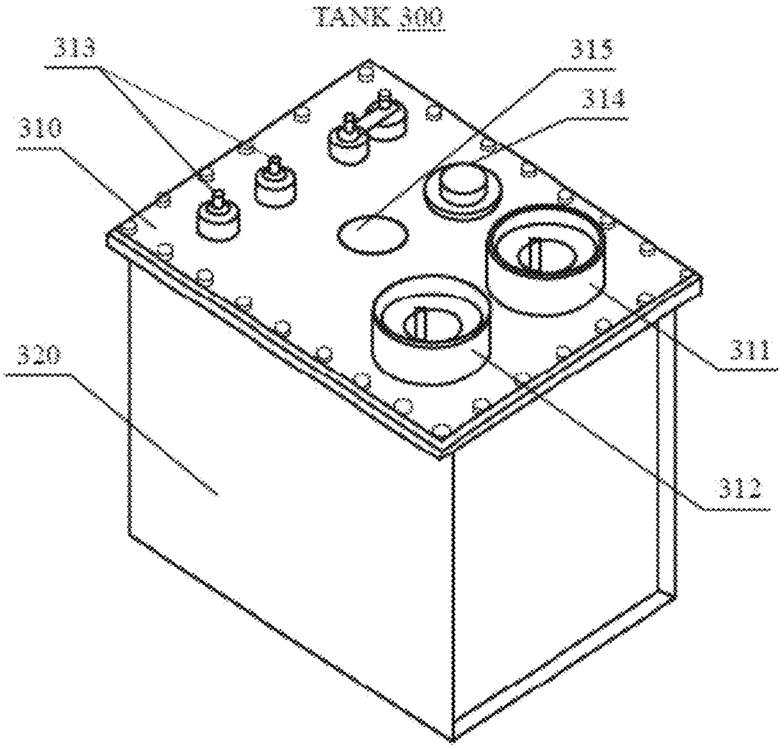
FIG. 3
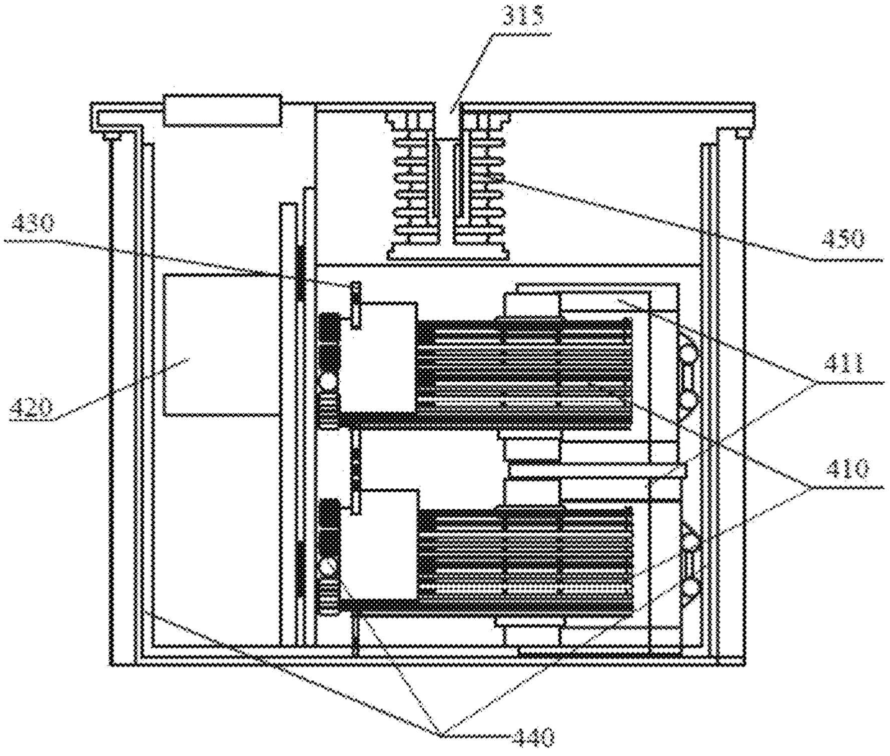
FIG. 4-A

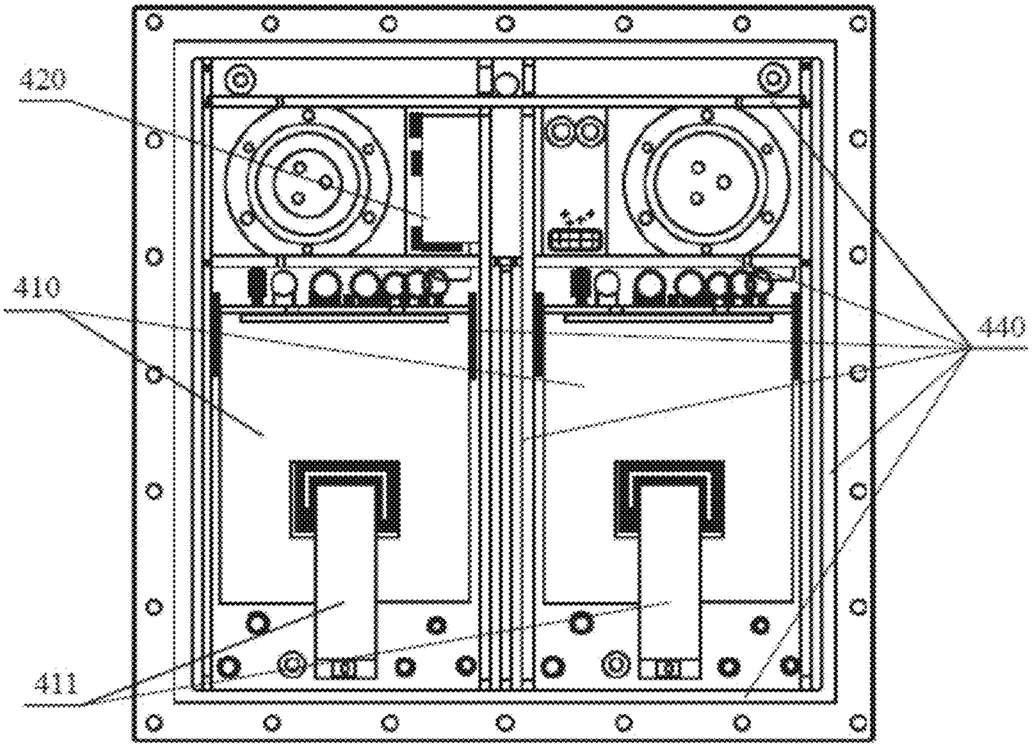
FIG. 4-B
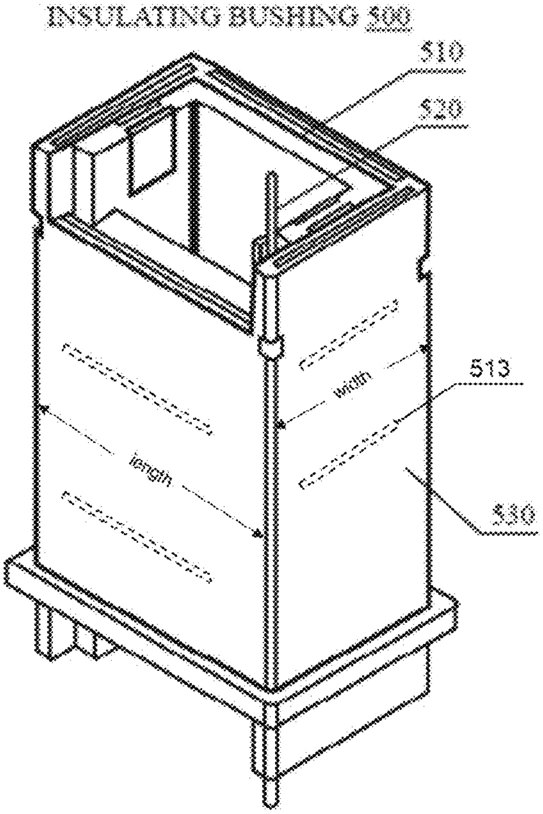
FIG. 5-A

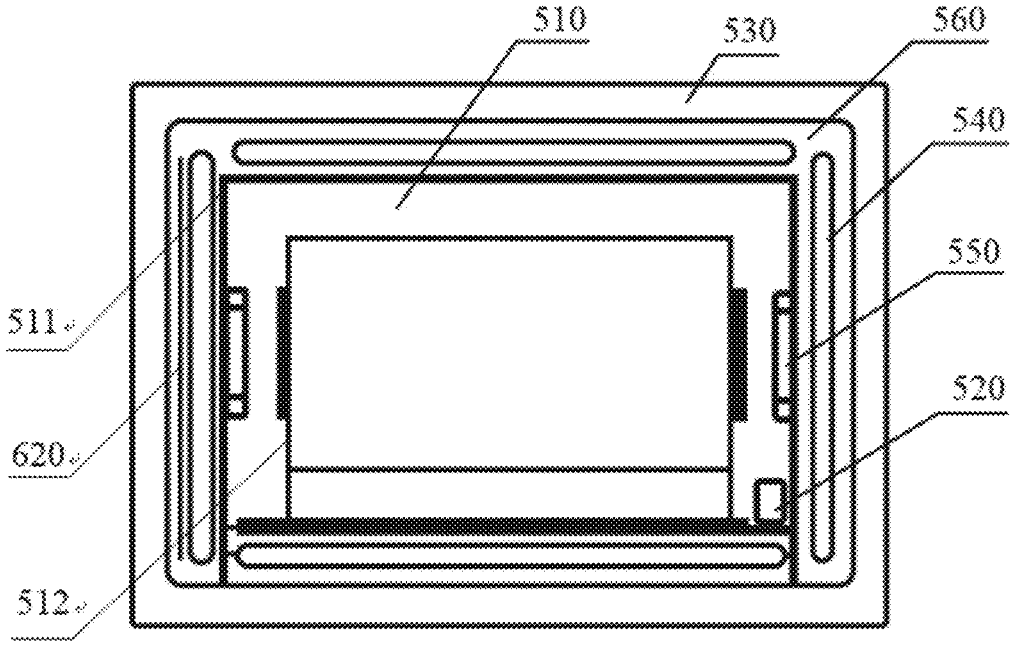
FIG. 5-B
TRANSFORMER 600
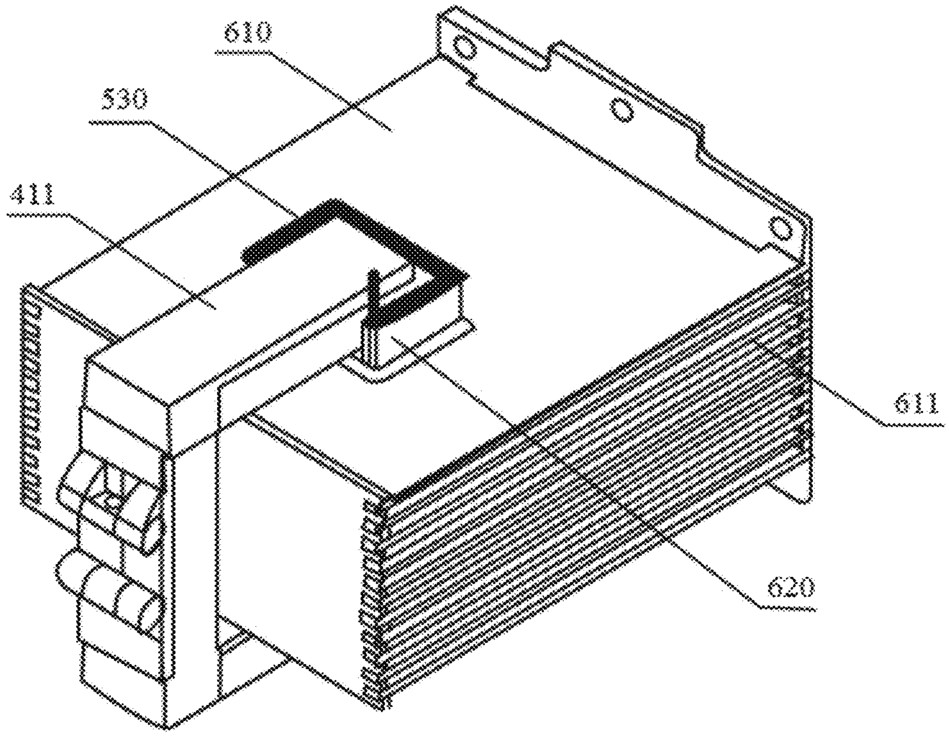
FIG. 6

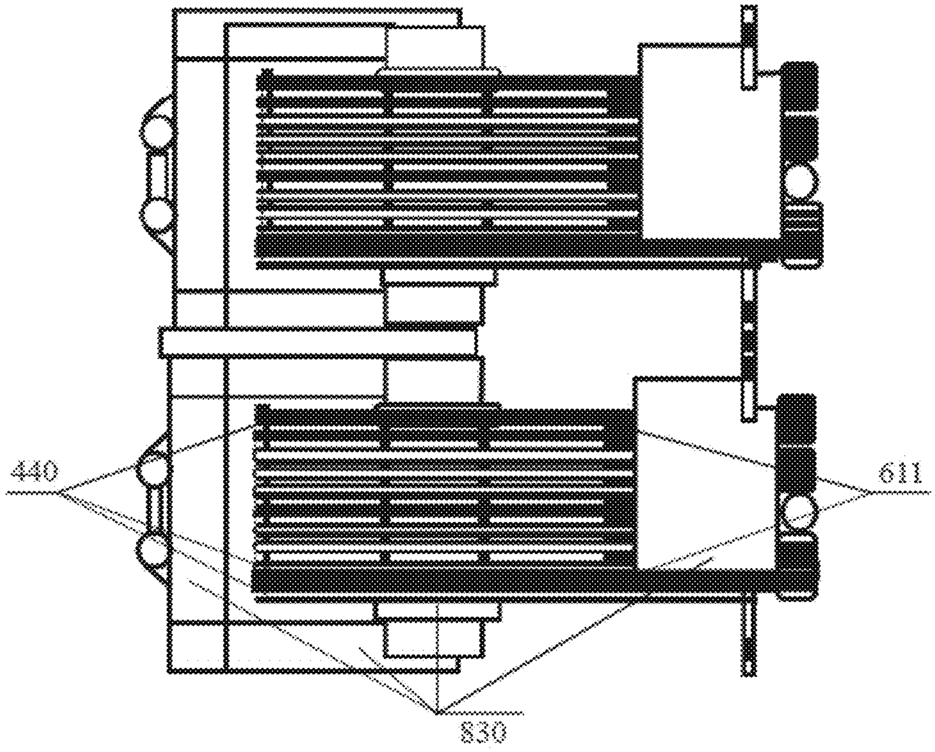
FIG. 9
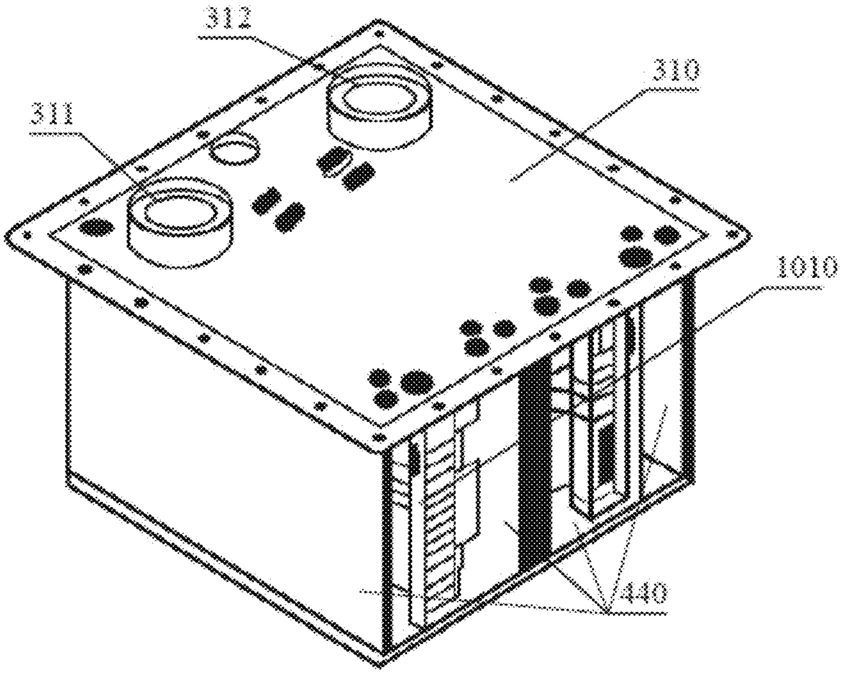
FIG. 10-A

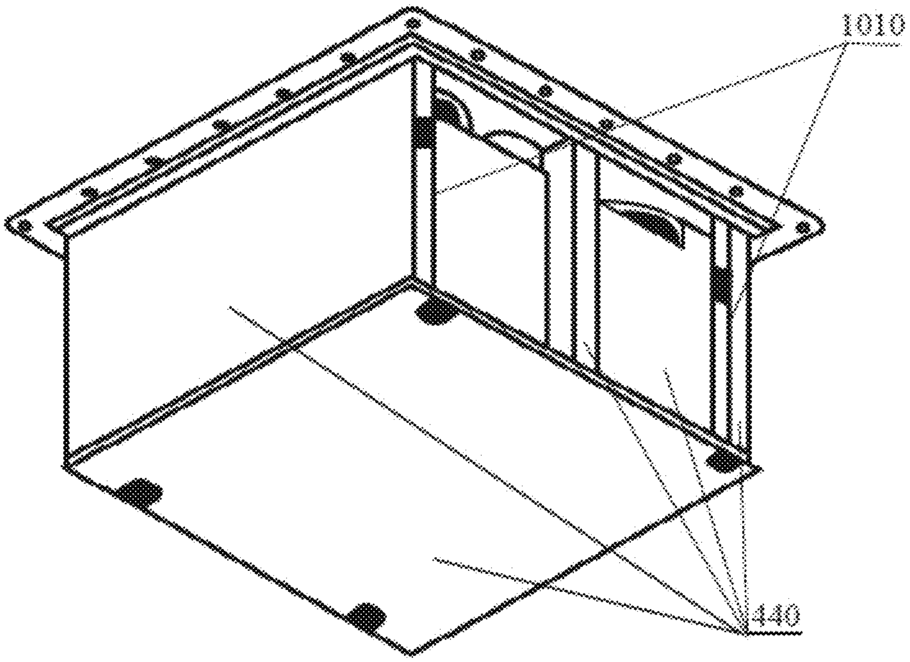
FIG. 10-B
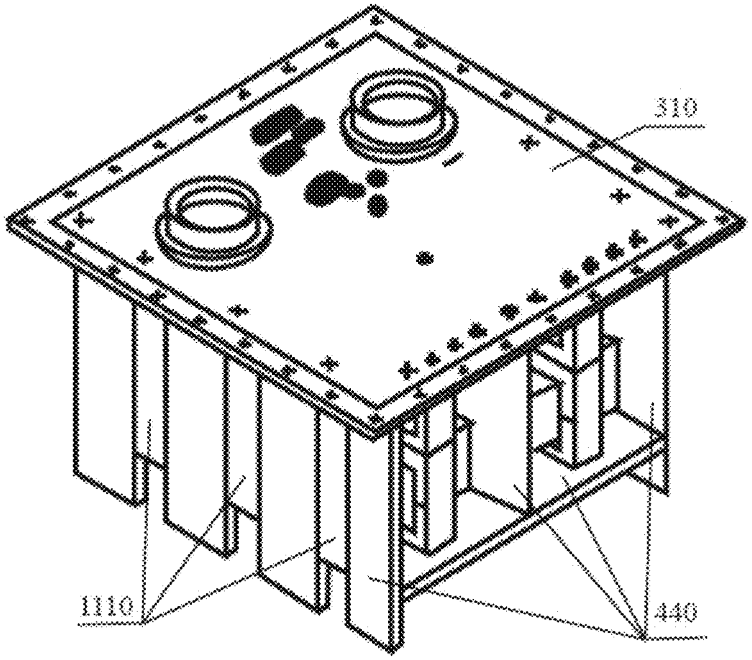
FIG. 11-A

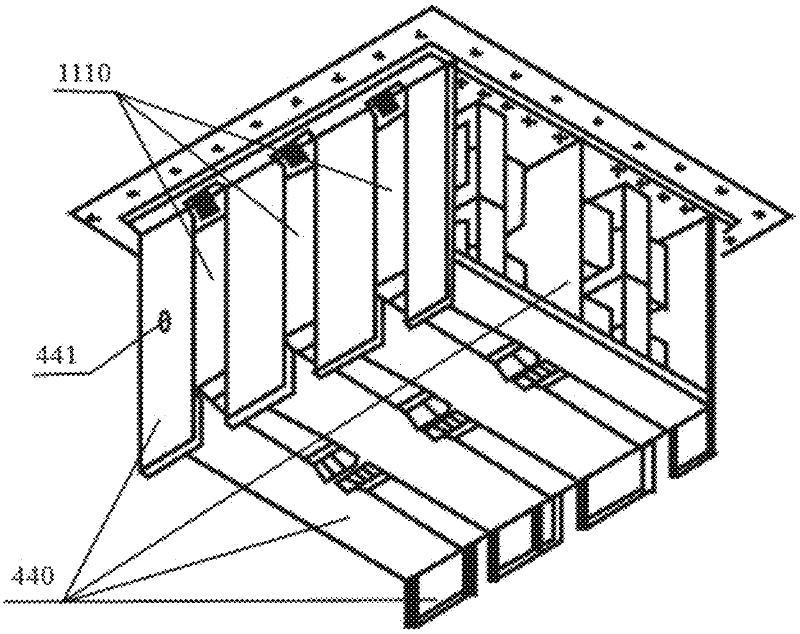
FIG. 11-B
BELLOWS 450
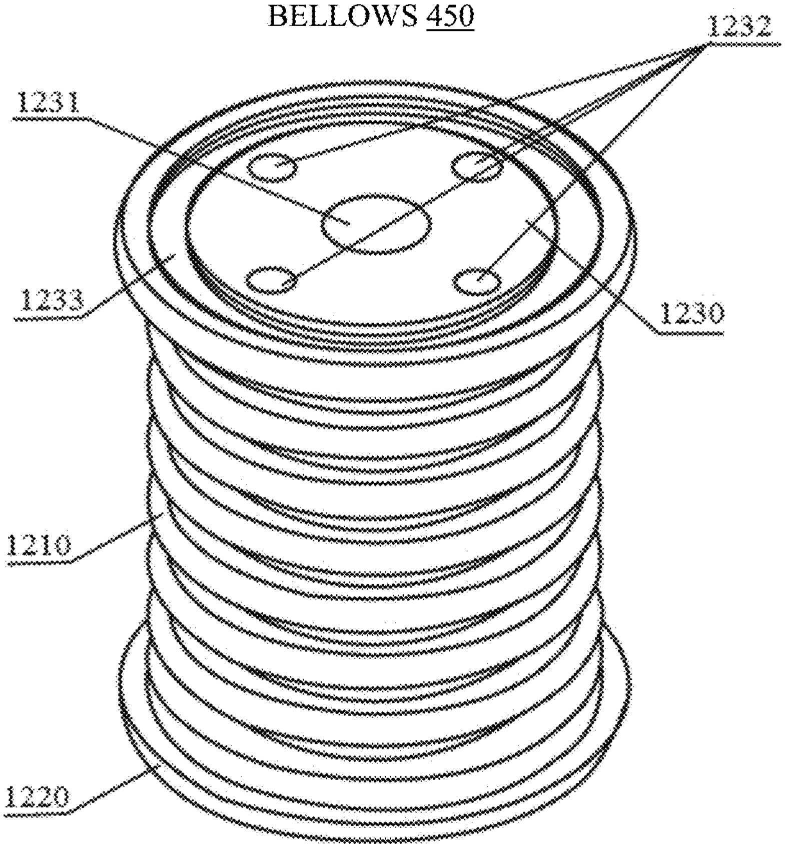
FIG. 12-A

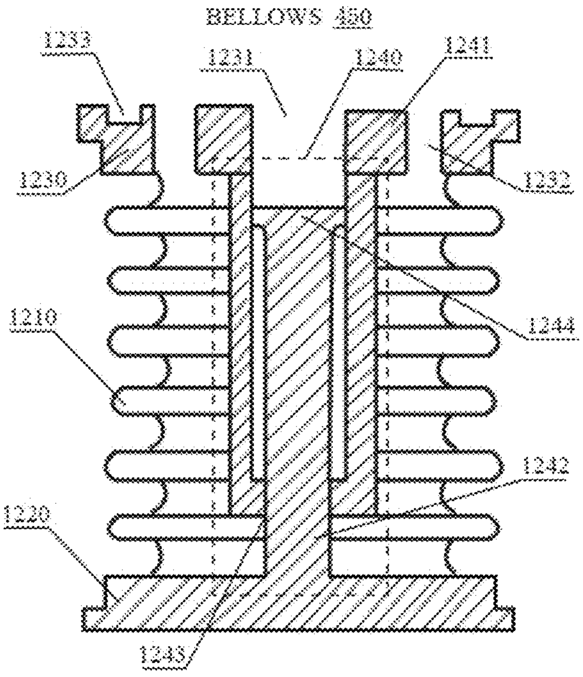
FIG. 12-B
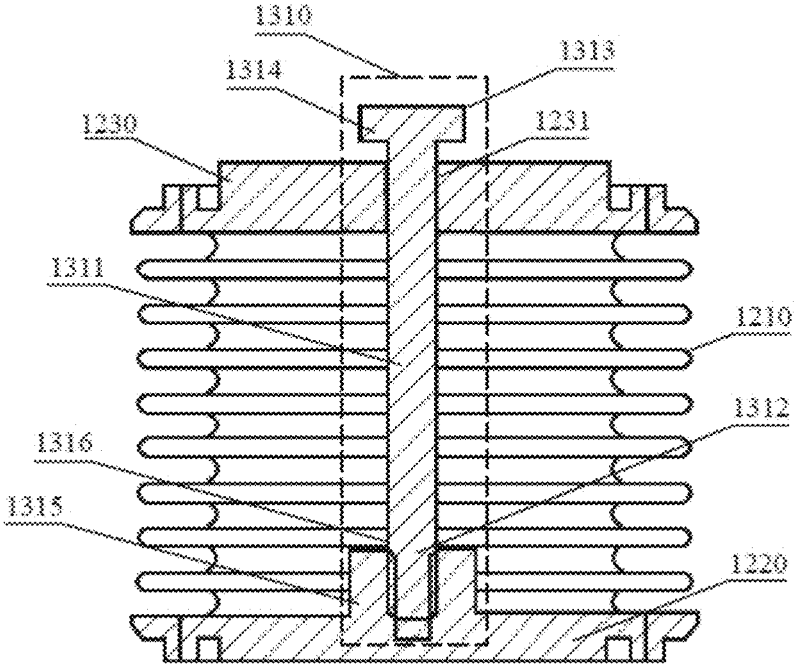
FIG. 13

METHOD AND DEVICE FOR INSULATION OF HIGH-VOLTAGE GENERATOR TANK

CROSS-REFERENCE TO RELATED APPLICATIONS

This application is a continuation of U.S. application Ser. No. 16/266,046, filed on Feb. 2, 2019, which is a Continuation of U.S. application Ser. No. 15/321,820, filed on Dec. 23, 2016, based on International Application No. PCT/CN2015/082086, filed on Jun. 23, 2015, designating the United States of America, which claims priority of Chinese Application No. 201410283792.8 filed on Jun. 23, 2014, the entire contents of which are hereby incorporated by reference.

TECHNICAL FIELD

This application generally relates to the field of electricity, and more particularly, to a high-voltage generator and a tank of the high-voltage generator.

BACKGROUND

A general high-voltage generator may contain several components, including, but not limited to, a main transformer, a filament transformer, a high-voltage socket, a sampling board, all of which may be sealed into a tank. When used, the tank may be set into a vacuum state, for example, by means of drawing out water and/or impurities in the air, and then fully injecting the tank with transformer oil. The transformer oil may have functions of insulating, dissipating heat, and eliminating electric arc, etc., which may maintain the normal running of the components in the high-voltage tank.

However, several questions may appear during the use of a tank: (1) the tank is usually under a strong electric field, which may cause phenomena such as corona discharge, free discharge, etc. The discharge phenomena may generate free electron(s), which may make the transformer oil gasify and dissociate gas or gas bubble(s); (2) the transformer oil itself may include some impurities, gas bubbles, water, etc., which may lead to phenomena such as electrical leakage or short circuit, and may further affect the insulating effect of the transformer oil; and (3) the transformer in the tank may cause phenomena such as hysteresis loss, eddy current losses, etc., during which some heat may be generated in the transformer oil and cause an expansion in transformer oil volume. Furthermore, the contraction in the volume of the transformer oil during a later cooling process may cause generation of gas bubbles in the transformer oil.

The above-described impurities, bubbles, and/or water in the transformer oil may lead to phenomena such as bubble breakdown, bridge breakdown, arc discharge, etc. The phenomena may reduce the insulativity of the transformer oil and affect the stability of high-voltage generator. Furthermore, the phenomena may cause aging of the transformer oil and other components and reduce the life of the high-voltage tank.

SUMMARY

In a first aspect of the present disclosure, a transformer of a high-voltage generator in a tank is provided. The transformer may include an inner insulating bushing, an outer insulating bushing, a winding which is wound on the inner insulating bushing, and an iron core. The inner insulating bushing may be located within the outer insulating bushing, and the iron core may go through the inner insulating bushing. There may be a gap between the winding of the inner insulating bushing and the outer insulating bushing.

In some embodiments, to improve the insulativity, one or more insulating paper layers may be set in the gap between the winding of the inner insulating bushing and the outer insulating bushing.

In some embodiments, to improve the insulativity, one or more insulating paper layers may be set between the inner insulating bushing and the iron core.

In some embodiments, to ensure a stable relative position of the inner insulating bushing and the outer insulating bushing, a fixture may be set in the gap between the winding of the inner insulating bushing and the outer insulating bushing.

In a second aspect of the present disclosure, a transformer of a high-voltage generator in a tank is provided. The transformer may include an inner insulating bushing, a low-voltage winding, a high-voltage winding, a printed circuit board (PCB) and an iron core. The low-voltage winding may be wound on the inner insulating bushing, and the high-voltage winding may be wound on the printed circuit board. The high-voltage winding may be located outside the low-voltage winding.

In some embodiments, the printed circuit board may include a rectifier block which may change an alternating current into a direct current.

In some embodiments, the transformer may include more than one printed circuit boards, and the printed circuit boards may be configured in a stack structure. The thickness of, amount of, and the spacing between the printed circuit boards may be varied based on specific conditions of use.

In some embodiments, an oil barrier may be set above and below the stack structure of the printed circuit boards.

In some embodiments, the transformer may include a sampling board.

In some embodiments, the transformer may further include an outer insulating bushing. The outer insulating bushing may be located within a through hole in the stack structure of the printed circuit boards. One end of the stack structure of the printed circuit boards may be connected with an oil barrier, and another end of the stack structure of the printed circuit boards may be connected with the sampling board.

In some embodiments, the stack structure of the printed circuit boards may be connected with the sampling board in a detachable or a non-detachable manner.

In some embodiments, an insulating paper layer or an oil barrier may be set at the end of the stack structure of the printed circuit boards that contacts the iron core to separate the end from the iron core.

In some embodiments, the transformer may further include an oil barrier. The oil barrier may be set at least one of following positions: above and below the stack structure of the printed circuit boards, a position between the transformer and the ground, a position between the transformer and the tank.

In some embodiments, the oil barrier may include a single oil barrier, or an array which includes more than one oil barriers.

In some embodiments, the arrangement of the oil barriers may be side-to-side, or front-to-back.

In a third aspect of the present disclosure, a tank of a high-voltage generator is provided. The tank may include an opening in the tank lid; and a bellows may be coupled to the tank. One end of the bellows may include an opening and another end of the bellows may be closed. The opening end of the bellows may be fixed to the tank, and the opening of the bellow may correspond to the opening on the tank.

In some embodiments, the bellows may include a guide structure, which may lead the bellows to extend or shorten axially and fix the bellows.

In some embodiments, the guide structure of the bellows of the tank may include a guide rod.

In some embodiments, the guide rod of the guide structure may extend outside the opening of the bellows.

In some embodiments, the guide structure of the bellows of the tank may further include a guide casing which is set outside the guide rod.

In some embodiments, the guide rod of the guide structure may be lower than the opening of the bellows.

BRIEF DESCRIPTION OF THE DRAWINGS

FIG. 3 is a schematic diagram depicting an exemplary structure (perspective view) of a high-voltage generator tank according to some embodiments of the present disclosure;

FIG. 4-A is a schematic diagram depicting an exemplary structure (left view) of a high-voltage generator tank according to some embodiments of the present disclosure;

FIG. 4-B is a schematic diagram depicting an exemplary structure (top view) of a high-voltage generator tank according to some embodiments of the present disclosure;

FIG. 5-A is a schematic diagram depicting an exemplary structure (perspective view) of an insulating bushing in a transformer of a high-voltage generator according to some embodiments of the present disclosure;

FIG. 5-B is a schematic diagram depicting an exemplary structure (top view) of an insulating bushing in a transformer of a high-voltage generator according to some embodiments of the present disclosure;

FIG. 6 is a schematic diagram depicting an exemplary structure (perspective view) of an installation of a high-voltage winding and a low-voltage winding according to some embodiments of the present disclosure;

FIG. 9 is a schematic diagram (right view) depicting an exemplary transformer of a high-voltage generator according to some embodiments of the present disclosure;

FIG. 10-A is a schematic diagram depicting an exemplary insulating method used in a tank of a high-voltage generator according to some embodiments of the present disclosure;

FIG. 10-B is a schematic diagram depicting an exemplary insulating method used in a tank of a high-voltage generator according to some embodiments of the present disclosure;

FIG. 11-A is a schematic diagram depicting an exemplary insulating method used in a tank of a high-voltage generator according to some embodiments of the present disclosure;

FIG. 11-B is a schematic diagram depicting an exemplary insulating method used in a tank of a high-voltage generator according to some embodiments of the present disclosure;

FIG. 12-A is a schematic diagram depicting an exemplary structure (perspective view) of a bellow in a tank of a high-voltage generator according to some embodiments of the present disclosure;

FIG. 12-B is a schematic diagram depicting an exemplary structure (section view) of a bellows in a tank of a high-voltage generator according to some embodiments of the present disclosure;

FIG. 13 is a schematic diagram depicting an exemplary structure (section view) of a bellows in a tank of a high-voltage generator according to some embodiments of the present disclosure.

DETAILED DESCRIPTION

In the following detailed description, numerous drawings according to some embodiments of the present disclosure are set forth in order to provide a thorough understanding of the relevant disclosure. To make it convenient for persons having ordinary skills in the art to understand, reproduce and/or apply this disclosure, the following description would be presented in some specific embodiments. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims. Furthermore, the same label in the following drawings may represent the same structure or the same step, unless the context clearly indicates otherwise.

As used herein, the singular forms “a,” “an,” and “the” may be intended to include the plural forms as well, unless the context clearly indicates otherwise. It will be further understood that the terms “include” and/or “comprising” when used in this disclosure, specify the presence of steps or components, but do not exclude the presence or addition of one or more other steps or components in a method or a device.

The method and device for the insulation of a high-voltage generator tank described in the present disclosure may be applied in many fields including, for example, medical technology, industrial control, automation, aerospace, automobile transportation, mobile communication, etc. This present disclosure may be applied in any field mentioned above for insulation and protection of a high-voltage generator to improve stability and safety of the high-voltage generator. In some embodiments, this disclosure may be applied in the field of medical instruments. For example, the present disclosure may be used as a method and device for the insulation of a high-voltage X-ray generator tank. In the context, the method and device for the insulation of the high-voltage generator tank will be described merely as an example for illustration, while the disclosure may be applied in other fields.

Figure 1:
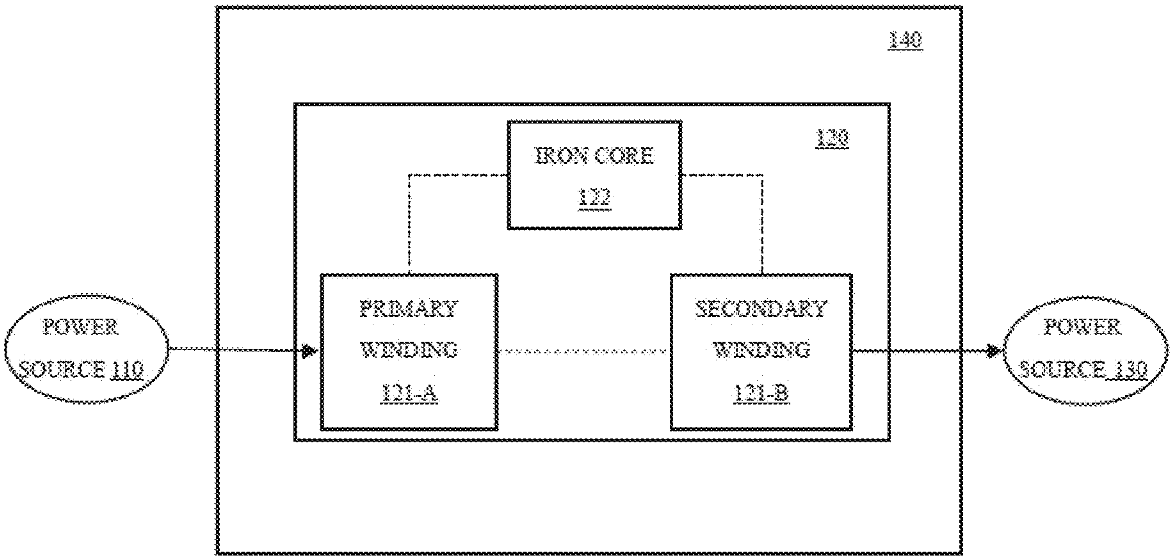
FIG. 1 is a schematic diagram depicting an exemplary transformer according to some embodiments of the present disclosure.

A transformer is an electrical device which, through electromagnetic induction may transfer voltage/current/impedance, isolate dangerous voltage, and stabilize voltage. The transformer may be used for increasing or decreasing a voltage, and transforming a current in a power transmission and distribution system. FIG. 1 is a diagram illustrating a transformer according to some embodiments of the present disclosure. As shown in the figure, a power source 110 may be input to a transformer 120 and a power source 130 may be output. In some embodiments, the transformer 120 may include a winding 121 and an iron core 122. The windings

121 and the iron core 122 may be used to generate a magnetic field, transfer a voltage, and transmit power energy.

In some embodiments, the transformer winding 121 may be a coil wound by a wire. The type of the winding 121 may be a double-winding type, and may also be a triple-winding type. A double-winding transformer may connect two voltage levels through two windings. A triple-winding transformer may connect three voltage levels through three windings. For better illustration, a double-winding transformer will be described as an example. In some embodiments, a double-winding transformer may include a primary winding 121-A and a secondary winding 121-B. The primary winding 121-A may be configured to be connected to the input power source 110, and the secondary winding 121-B may be configured to output to the power source 130. The number of the primary winding(s) and/or secondary winding(s) may be one, two, or more. Under the input power source 110, an alternating current may pass through the primary winding 121-A. The alternating current in the iron core 122 may generate an alternating magnetic flux, whose frequency may be in accordance with the power source 110. According to the principle of electromagnetic induction, the alternating magnetic flux may generate an electromotive force in the secondary winding 121-B by induction. Upon obtaining an electromotive force, the secondary winding 121-B may supply electricity to a load, for example, an output power source 130. Further, in some embodiments, for in a step-up transformer, the primary winding 121-A may be called the low-voltage winding, and the secondary winding 121-B may be called the high-voltage winding.

The detailed structure of the winding 121 in a transformer may be determined on the basis of the voltage rating and the insulation demand. In some embodiments, the primary winding 121-A may be located in the inner layer, near the iron core 122, and the secondary 121-B may be located on the outer layer, outside the primary winding 121-A. The winding methods of the windings in a transformer may be a concentric type or an overlapping type. In the embodiments of the concentric type, the winding methods may be a cylinder type, a spiral type, a successive type, or the like, or any combination thereof. In the embodiments of the cylinder type, the winding methods may be a monolayer type, a bilayer type, a multilayer type, a section cylinder type, or the like, or any combination thereof.

In some embodiments, the winding 121 in a transformer may include a wire and an insulating paper layer that covers the wire. In some embodiments, the cross section shape of the wire may include a circular shape, an oblate shape, an elliptical shape, an irregular shape, or the like, or any combination thereof. The materials of the wire may include copper, aluminum, alloy, or the like, or any combination thereof. The materials of the insulating paper may include insulating paint, synthetic resin, glass fiber, insulating paper, other organic or inorganic material, or any combination thereof.

The iron core 122 may supply a magnetic circuit in a transformer and also supply a skeleton of the winding 120. In some embodiments, the iron core 122 may include an iron pillar and an iron yoke (not shown in the figure). The iron pillar may be covered by a winding, and the iron yoke may assist the generation of a magnetic circuit. The structure of the iron core may be a core type or a shell type. In the embodiments of the core type, its iron yoke may be near the top and bottom of the winding, while not surrounding the side of the winding. In the embodiments of the shell type, its iron yoke may be surrounding the top, the bottom, and the side of a winding simultaneously. In some embodiments, the materials of the iron core may include a ferrite or a silicon steel sheet with high magnetic permeability. The type of the silicon steel sheet may include, but not limited to, a hot-rolled silicon steel sheet, a cold-rolled, non-oriented silicon steel sheet, a cold-rolled, grain-oriented silicon steel sheet, or the like, or any combination thereof.

Depending on whether a transformer has an enclosing structure, a transformer may be either an open-type or a closed-type. In the embodiments of the open-type, the winding and iron core may contact the atmosphere directly. In the embodiments of the closed-type, the winding and iron core may be in a closed shell. As shown in FIG. 1, the transformer 120 may be located in a specific container 140 and some insulating medium may be introduced to the container 140 for closed-type transformers. The insulating medium may include, but is not limited to, gas or liquid. In the embodiments with gaseous insulating medium, the insulating medium may be air (a mixture of gases), nitrogen ($N_2$), carbon dioxide ($CO_2$), sulfur hexafluoride ($SF_6$), or the like, or any combination thereof. In the embodiments with liquid insulating medium, the insulating medium may be mineral insulating oil, synthetic insulating oil, vegetable oil, or the like, or any combination thereof. The stated mineral insulating oil may further include paraffin based, naphthenic based, mixed-based, or the like, or any combination thereof. The stated synthetic insulating oil may further include aromatic synthetic oil, silicone oil, fatty oil, ethers synthetic oil, sulfone synthetic oil, polybutylene, or the like, or any combination thereof. The stated vegetable oil may include castor oil, soybean oil, rapeseed oil, or the like, or any combination thereof.

Figure 2:
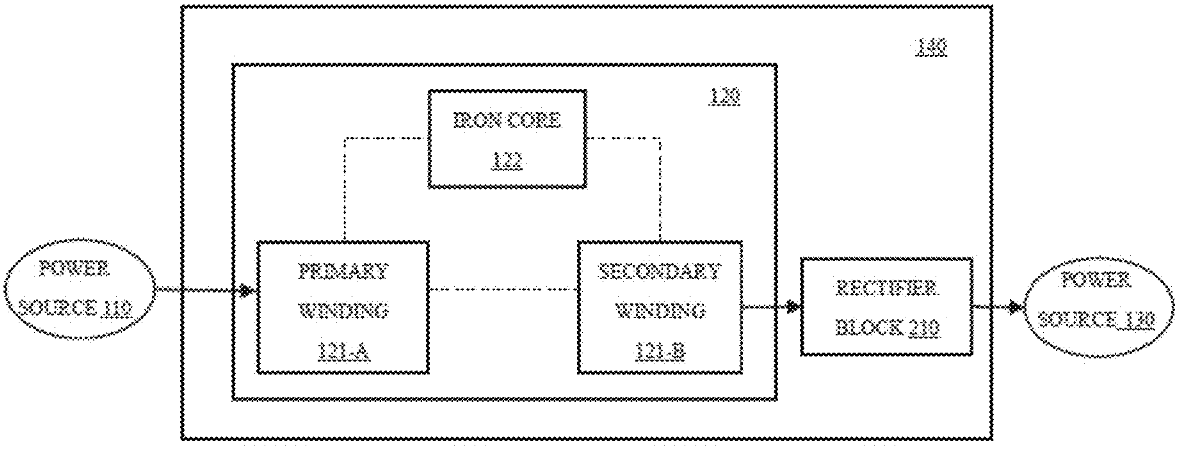
FIG. 2 is a schematic diagram depicting an exemplary transformer according to some embodiments of the present disclosure.

For most electrical equipment, there may be not only a demand for voltage transformation, but also a need for current transformation, such as changing alternating current into direct current, or changing direct current into alternating current. The type of the current transforming device may include, but is not limited to, a rectifier block or an inversion block. The rectifier block may be configured to transform alternating current into direct current, and the inversion block may transform direct current into alternating current. The rectifier block may include, but is not limited to, a diode rectifier, a silicon controlled rectifier, a thyristor rectifier, a bridge rectifier, or the like, or any combination thereof. The inversion block may include, but is not limited to, a single-phase half-bridge inverter, a single-phase whole-bridge inverter, a push-pull inverter, a three-phase bridge inverter, or the like, or any combination thereof. FIG. 2 illustrates an exemplary rectifier block in a closed-type transformer according to some embodiments of the present disclosure. As shown in figure, a rectifier block 210 may be located at the output of the transformer 120. It should be noted that the position of the rectifier block may be in the transformer, out of the transformer but in the container 140, or out of the container 140.

In an X-Ray diagnosis or therapy system, a high-voltage generator may supply high voltage to an X-ray tube through a transformer. The transformer of the high-voltage generator may be an open-type or a closed-type. For illustration purposes, an exemplary oil-filled transformer of the closed-type may be described below. In some embodiments, the oil-filled transformer may include a container and an insulating medium therein. The container of the oil-filled transformer may be a box and the insulating medium may be gas or liquid. As the X-ray tube requires a direct current input, in some embodiments, a rectifier block may be configured to generate the said direct current for the X-ray tube. It should be noted that the position of the rectifier block may be in the transformer, out of the transformer but in the container, or out of the container.

FIG. 3 is a schematic diagram depicting an exemplary structure (perspective view) of a high-voltage generator tank according to some embodiments of the present disclosure. As illustrated in FIG. 3, the container is of a box type and the insulating medium is liquid. In some embodiments, the liquid insulating medium may include, but is not limited to, mineral insulating oil, synthetic insulating oil, vegetable oil, or the like, or any combination thereof. As further illustrated in FIG. 3, the high-voltage generator tank 300 may include a tank lid 310 and a tank body 320. In some embodiments, the tank lid 310 may also include a positive high-voltage socket 311, a negative high-voltage socket 312, a terminal 313, an electric connector 314, and an opening 315.

In some embodiments, the positive high-voltage socket 311 and the negative high-voltage socket 312 may output high voltage through a wire (not shown in the figure) to the X-ray tube. It should be noted that the type and the position of the positive high-voltage socket 311 and the negative high-voltage socket 312 may be changed in other embodiments. The terminal 313 may be an input interface of high alternating voltage and supply power to the high-voltage generator, but it should be noted that the input interface can be of another type in other embodiments. The electric connector 314 may be configured to transmit a feedback signal from a sampling board to judge whether the positive and the negative high voltages are stable. In other embodiments, the feedback signal from the sampling board may be not necessary so that the electric connector may be omitted. It should be not that the description above is merely provided for the purposes of illustration, and not intended to limit the scope of the present disclosure.

In some embodiments, the opening 315 in the high-voltage generator tank may be configured to connect to a bellows (not shown in the figure) to compensate for the volume change of the transformer oil. The shape, size, position, and amount of the opening may be determined according to the bellows and the tank. For example, the opening may be arranged according to the position of the bellows, which may be located at the center of the tank lid, or at another location. In some embodiments, the number of opening(s) may be the same with the number of bellows, or only one opening shared by multiple bellows. For detailed disclosure of the bellows, the corresponding part of the present disclosure may be taken as reference.

The weight of the tank may be one of the factors that affects the stability of an X-ray high-voltage generator system. The lighter the tank is, the less burden there may be on the system. In operating scenarios, the tank may rotate along the cavity of the system, and the consequent centrifugal force may increase as the weight of the tank increases. Therefore, a lighter tank may improve the stability of the whole system by reducing centrifugal force efficiently. The weight of a tank may be closely related to its size and material. In some embodiments, the shape of the tank may be a regular geometric shape including, for example, a cuboid, a cub, a cylinder, or it may be other irregular geometric shapes. And the material of the tank may be chosen from high strength and/or low-density materials, including, for example, steel (e.g., stainless steel, carbon steel, etc.), lightweight alloys (e.g., aluminum alloy, magnesium alloy, titanium alloy, etc.), plastic (e.g., a HMWHDPE, a blow molding nylon, engineering plastics, etc.), or any other single material or composite material with similar performance. Merely by way of example, the composite material may include a reinforced phase including, for example, fiberglass, carbon fiber, boron fiber, graphite fiber, graphene fiber, silicon carbide fiber, aramid fiber, or the like, or any combination thereof. And the material of the tank may also be a compound of organic and/or inorganic material, e.g., glass fiber reinforced unsaturated polyester, or glass fiber-reinforced plastics with an epoxy resin matrix or a phenolic resin matrix.

A sealing ring or other sealing device(s) (not shown in the figure) may be used between the tank body 320 and the tank lid 310. In some embodiments, the materials of the sealing ring may be chosen from oil resistant, high-temperature resistant, and/or deformation resistant materials, such as rubber. Merely by way of example, the rubber may be general rubber or special type rubber. The general rubber may include, but is not limited to, natural rubber, isoprene rubber, styrene-butadiene rubber, butadiene rubber, neoprene, or the like, or any combination thereof. The special type rubber may include, but is not limited to, butadiene-acrylonitrile rubber, silicone rubber, fluoro rubber, polysulfide rubber, polyurethane rubber, chlorohydrin rubber, acrylic rubber, epoxy propane rubber, or the like, or any combination thereof. In some embodiments, the styrene-butadiene rubber may include, but is not limited to, emulsion polymerization of styrene-butadiene rubber and solution polymerization styrene-butadiene rubber.

It should be noted that the above description of the tank lid, the tank structure and the tank material are merely for illustration purposes, and will not limit the present disclosure to particular embodiments. Any modifications without innovative points may be made by persons having ordinary skills in the art. For example, two or more high-voltage sockets may be used when multiple voltages outputted from the transformer. As another example, the opening can be removed from the top of the tank lid to the side surface. However, those variations and modifications do not depart from the scope of the present disclosure.

FIG. 4-A is a schematic diagram illustrating an exemplary high-voltage generator tank according to some embodiments of the present disclosure. The tank may include a main transformer group 410, a filament transformer 420, a rectifier block (not shown in the figure), a sampling board 430, an oil barrier 440, and a bellows 450. In some embodiments, the insulating medium which immerse the above components in the tank may be an insulating liquid (not shown in the figure) or insulating gas. For illustration purposes, a tank which is contains insulating oil may be used as an example. It should be noted that the amount, location, and/or size of the components in the tank do not have to strictly follow the proportions and/or data shown in the legend and may be considered according to specific implementation scenarios. FIG. 4-A merely shows an embodiment according to the spirit and scope of the present disclosure, and persons have ordinary skill in the art may make some modifications.

In some embodiments, the main transformer group 410 may include a positive transformer and a negative transformer (not shown in the figure). The positive transformer (and/or negative transformer) may include an iron core 411, a primary winding, and a secondary winding (not shown in the figure). The primary winding and the secondary winding may be set on the same iron core and insulated from each other by an insulating bushing and coupled with each other via a magnetic field. Detailed illustration of the insulating bushing is described below in the corresponding sections.

In some embodiments, the filament transformer 420 may be a transformative device which is configured to supply a heating voltage for a filament and current for the focus lamps in the X-ray tube. It should be noted that the filament transformer 420 herein is merely for illustration purposes. In some embodiments, the filament transformer 420 may be omitted.

In some embodiments, the sampling board 430 may be configured to capture signals of positive and negative high-voltage, which may be voltage-multiplying rectified by the rectifier block. A sampling circuit may output high-voltage signals and current signals as feedback signals, which may be used for judging the stability of the high voltage and thus the stability of the high-voltage generator tank. In some embodiments, the sampling board 430 may also be configured to control the high/low voltage. It should be noted that the sampling board 430 is merely for illustration purposes. In some other embodiments, the sampling board may be omitted.

In some embodiments, the oil barrier 440 may be located between components in the tank or within a component therein to eliminate the bridge breakdown effect and keep the electric field uniform. For example, the oil barrier 440 may be placed within the transformer, between the positive transformer and the negative transformer, or between the positive/negative transformer and the ground. The thickness, amount, location, and/or material of the oil barrier 440 may be determined by specific implementation scenarios. Detailed illustration of the oil barrier is described blow in the corresponding sections.

In some embodiments, the bellows 450 may be configured to compensate volume change of transformer oil resulted from thermal expansion, and forbid the generation of gas bubbles. In some embodiments, the bellows 450 may be placed above or below the opening 315 of the tank lid 310. One side of the bellows 450 may be connected to tank lid 310 in a detachable or a non-detachable manner. The amount of the bellows 450 may be one or more, and its shape may include U-shape, V-shape, Q-shape, C-shape, S-shape, flat-shape, ladder planar-shape, single wave shape, wrinkle-shape, or any deformation, or any combination thereof. Its material may be metal, organic, inorganic, or the like, or any combination thereof.

FIG. 4-B is a schematic diagram illustrating an exemplary high-voltage generator tank according to some embodiments of the present disclosure, and it is also the top view of FIG. 4-A. It should be noted that the amount, location, and size of the components in the tank does not have to strictly follow the proportions and/or data shown in the legend and they may be determined according to specific implementation scenarios.

It should be noted that FIG. 4-A and FIG. 4-B are merely embodiments for illustration purposes according to the present disclosure. The location, size, relative location, relative size, amount, and shape of the components in the high-voltage tank are not limited to particular embodiments. Any modifications made by persons having ordinary skills in the art, are within the scope of the present disclosure. For example, the position of the main transformer group may be exchanged with the filament transformer. As another example, the position of the bellows may be changed. As still another example, the amount of the transformer may be changed. Persons having ordinary skills in the art may expand for modify FIG. 4-A and FIG. 4-B within the spirit and the scope of the present disclosure.

The transformer oil in the tank may have functions such as insulation, arc suppression, and heat dissipation. In some embodiments, the transformer oil may insulate and protect the high/low-voltage windings and other components. In some embodiments, the transformer oil may also process arc suppression at the contacts between the high-voltage lead and the switch and may prevent the generation of corona and arc discharge. In some embodiments, the transformer oil may also be used to improve heat exchange and cooling rate within the tank when it flows. The transformer oil may be paraffin-based, naphthenic-based, or mixed-based. In the present embodiments, the transformer oil may be low density, medium viscosity, high flashing point, low freezing point, low impurity, and low oxidation level. Other properties may be required according to specific implementation scenarios. For example, in some embodiments, the requirements may include kinematic viscosity (50° C.)≤$9.6\times10^{-6}$ $m^2/s$, flashing point≥135° C., and freezing point<−22° C. And product type of the transformer oil may be chosen from #10, #25, #45, etc.

FIG. 5-A is a schematic diagram illustrating an exemplary insulating bushing of a high-voltage generator transformer according to some embodiments of present disclosure. As shown in FIG. 5-A, a low-voltage winding 511 (as shown in FIG. 5-B) may be wound on an inner insulating bushing 510, and a winding lead 520 may be drawn from a side notch of the inner insulating bushing 510. An outer insulating bushing 530 may be located outside of the low-voltage winding 511. In some embodiments, there may be a gap between the-inner insulating bushing 510 and the outer insulating bushing 530 (e.g., the gap 560 shown in FIG. 5-B), or between the low-voltage winding 511 and the iron pillar for insulation and heat dissipation, where an insulating paper layer 512 (as shown in FIG. 5-B) and an insulating paper layer 620 (as shown in FIG. 6) may be set, respectively. The width of the gap 560 may be determined by the requirements of voltage rating and/or cooling rate. In some embodiments, the high-voltage winding may be mounted on the outer insulating bushing 530, and the iron pillar may thread the inner insulating bushing 510 and have functions of fixation and restriction.

In some embodiments, the insulation methods of the high-voltage generator tank may include liquid (e.g., transformer oil) and some other assistant manners. For example, in primary insulation, an insulating paper layer may be set between the high-voltage winding and the low-voltage winding, or between the windings and the ground. In secondary insulation, a coating layer or an insulating layer may be set between different parts of a winding (for example, between different segments, between different interlayers, or between different turns). The design of the insulating paper, coating layer and/or insulating layer herein may provide a certain degree of insulation, but for situations with higher insulation requirements, the insulating method described above may be improved in some embodiments.

FIG. 5-B is a schematic diagram depicting an exemplary structure of an insulating bushing in a transformer of a high-voltage generator according to some embodiments of the present disclosure. It is also the top view of FIG. 5-A. As shown in the figure, the inner insulating bushing 510 and the outer insulating bushing 530 may be configured to fix the leads of the high-voltage and the low-voltage to the outside of the tank. In some embodiments, the inner insulating bushing 510 and the outer insulating bushing 530 may be configured to improve the insulativity of the windings when placed in the windings of the transformer. In the present disclosure, the insulating bushings may be required to meet certain electrical strength and mechanical strength requirements. The material of the insulating bushing may have excellent thermal stability. For example, the insulating bushings may survive in an immediate overheating scenario caused by, for example, a short circuit. In some embodiments, the weight and size of the insulating bushings may be as small as possible.

In some embodiments, the type of the insulating bushing may be a single bushing, a compound bushing, or a capacitive bushing. Furthermore, the capacitive bushing types may include gummed paper capacitive bushing, oil paper capacitive bushing, or capacitive bushing of other materials. In the embodiments of the gummed paper capacitive bushing, its capacitive core may be manufactured by rolling a gummed paper and an aluminum foil in an interlaced way under high pressure and high temperature. In the embodiments of the oil paper capacitive bushing, its capacitive core may be manufactured by rolling an oil paper and an aluminum foil in an interlaced way under high pressure and then being immersed in oil under vacuum. In the embodiments of the capacitive bushing of other materials, the material may be a composite material comprised of two or more kinds of materials.

In some embodiments, the composite material may include a matrix phase and a reinforcement phase. According to the distribution of the reinforcement phase in the matrix phase, the composite material may be a fiber reinforced composite, a particle reinforced composite, a thin-layer reinforced composite, a multilayer composite, or the like, or any combination thereof. In the embodiments of the fiber reinforced composite, it may include a fiber reinforced plastic, a fiber reinforced rubber, a fiber reinforced ceramic, a fiber reinforced metal, or the like, or any combination thereof. The fiber reinforcement phase may further include glass fiber, quartz fiber, carbon fiber, silicon carbide fiber, aluminum oxide fiber, boron fiber, boron nitride fiber, or the like, or any combination thereof. In the embodiments of the particle reinforced composite, the particle reinforcement phase may include metal particle, ceramic particle, dispersion-strengthened metal particle, or the like, or any combination thereof. For example, the particle reinforced phase may further include silicon carbide particle, titanium carbide particle, boron carbide particle, aluminum oxide particle, silicon nitride particle, boron nitride particle, graphite particle, or the like, or any combination thereof. In the embodiments of the thin-layer reinforced composite material, the reinforcement phase may include graphite flake, talcum powder, mica powder, micaceous iron oxide, glass flake, stainless steel flake, non-ferrous metal flake, non-ferrous metallic oxide flake, or the like, or any combination thereof. In the embodiments of the multilayer composite material, the type may be double-layer, three-layer, multilayer in an interlaced way, or the like, or any combination thereof.

The matrix phase of the composite material may include a metal matrix phase and/or a non-metal matrix phase. The metal matrix phase composite may include an aluminum matrix composite, a titanium matrix composite, a copper matrix composite, an alloy matrix composite, or the like, or any combination thereof. The non-metal matrix composite may include a plastic matrix composite, a rubber matrix composite, a ceramic matrix composite, or the like, or any combination thereof. The plastic matrix composite may further include a polyethylene matrix composite, a polystyrene matrix composite, a polymethyl methacrylate matrix composite, a polyvinyl chloride matrix composite, a polyamide matrix composite, a polyester matrix composite, or the like, or any combination thereof. The rubber matrix composite may further include a butyl rubber matrix composite, a butadiene rubber matrix composite, a butadiene styrene rubber matrix composite, a butadiene-acrylonitrile rubber matrix composite, a polymethylphenyl siloxane matrix composite, a polydimethylsiloxane matrix composite, an epoxidized natural rubber matrix composite, or the like, or any combination thereof. The ceramic matrix composite may further include an oxide ceramic matrix composite, a carbide ceramic matrix composite, a nitride ceramic matrix composite, a microcrystalline glass matrix composite, or the like, or any combination thereof.

For illustration purposes, a composite material having a polycarbonate matrix phase and a glass fiber reinforcement phase may be described below as an exemplary embodiment. For example, the length of the glass fiber may be between 3 millimeters and 9 millimeters. The diameter of the glass fiber may be between 6 micrometers and 10 micrometers. Furthermore, the length-diameter ratio may be between 7 and 9. The proportion of the glass fiber in the composite material may be between 5% and 50% in weight. Furthermore, the proportion of the glass fiber in the composite material may be between 10% and 30% in weight. It should be noted that the above description of the embodiment is merely provided for illustration purposes, and not intended to limit the scope of the present disclosure. For persons having ordinary skills in the art, multiple variations and modifications may be made under the teachings of the present disclosure. For example, the polycarbonate matrix phase may be replaced by other materials, such as rubber (e.g., a butyl rubber matrix, a butadiene rubber matrix, a butadiene styrene rubber matrix, a butadiene-acrylonitrile rubber matrix, a polymethylphenyl sioxane matrix, a polydimethylsiloxane matrix, an epoxidized natural rubber matrix, etc.), plastic (e.g., a polyethylene matrix, a polystyrene matrix, a polymethyl methacrylate matrix, a polyvinyl chloride matrix, a polyamide matrix, a polyester matrix, etc.), metal (e.g., an aluminum matrix, a titanium matrix, a copper matrix, an alloy matrix, etc.), ceramic (e.g., a oxide ceramic matrix, a carbide ceramic matrix, a nitride ceramic matrix, a microcrystalline glass matrix, etc.), or the like, or any combination thereof. As another example, the glass fiber reinforcement phase may be replaced by other materials, such as another fiber reinforcement phase (e.g., quartz fiber, carbon fiber, silicon carbide fiber, aluminum oxide fiber, boron fiber, boron nitride fiber, etc.), a particle reinforcement phase (e.g., silicon carbide particle, titanium carbide particle, boron carbide particle, aluminum oxide particle, silicon nitride particle, boron nitride particle, graphite particle, etc.), a thin-layer reinforcement phase (e.g., graphite flake, talcum powder, mica powder, micaceous iron oxide, glass flake, stainless steel flake, non-ferrous metal flake, non-ferrous metallic oxide flake, etc.), or the like, or any combination thereof.

In some embodiments, the shape of the inner insulating bushing 510 (and/or the outer insulating bushing 530) may be a circle, a rectangle, a rounded rectangle, or other special shapes. The size and layout of the inner insulating bushing 510 (and/or the outer insulating bushing 530) may be determined according to specific implementation scenarios. In some embodiments, the inner insulating bushing 510 (and/or the outer insulating bushing 530) may be manufactured by traditional processes, such as being fired from insulating papers, or being made by a mold. For better understanding, a process of open molding may be used as an example. Firstly, the size of the inner and outer insulating bushings may be determined by actual requirements of voltage rating of the high-voltage transformer, insulation requirements of a transformer, and the present technical level. A mold may be designed after an evaluation of technical and/or production feasibility of the bushing. Then the raw material of the bushing may be placed into the mold, and the bushing may be finished after demolding. The described process of open molding is merely for better understanding and does not limit the molding process to be used. In some embodiments, the material of the mold may include hard alloy and steel. The forming method an insulating bushing may include compression molding, injection molding, extrusion molding, etc. The demolding method may include manual demolding, mechanical demolding, pressure demolding, temperature difference method, irrigation method, stripping method, or the like, or any combination thereof.

In some embodiments, a heat dissipation channel 540 may be set between the inner insulating bushing 510 and outer insulating bushing 530. In some embodiments, a fixture 550 may be added in the heat dissipation channel 540 to avoid relative movement between the inner and outer insulating bushings. Merely by way of example, the fixture 550 may be a spacer block. The shape of the fixture 550 may be determined according to specific implementation scenarios, for example, a cube, a cuboid, a cylinder, a sphere, a plate, or the like, or any combination thereof. In some embodiments, the fixture 550 may extend throughout or be a part of the length of the inner and outer insulating bushings. In some embodiments, the amount of the fixture 550 may be one or more. In some embodiments, the fixtures may be distributed at an equal distance, or at an unequal distance. In some embodiments, the materials of the fixture 550 may be the same as inner and outer insulating bushings, and may also be other materials with similar insulativity and supporting performance.

In addition, a certain amount of small oil passages 513 (as shown in FIG. 5-A) may be made on the outer insulating bushing. The oil passages 513 may lead the transformer oil into the outer insulating bushing 530. The insulativity and breakdown voltage may be significantly enhanced according to the forced oil volume principle. The outer insulating bushing 530 may be placed between the low-voltage winding and the high-voltage winding, and the increase in its insulativity may increase the insulativity between the low-voltage and the high-voltage windings. In some embodiments, the cooling rate of the transformer may be accelerated by the transformer oil flow through the oil passages 513. The conducting direction of the transformer oil in the oil passages 513 may be parallel to the axis of the outer insulating bushing, and may also be parallel to the cross-section of the insulating bushing. In some embodiments, the cross-section of the oil passage 513 may be a circle, a rectangle, a rounded rectangle, or other shapes. The oil passages_513 may extend throughout the length (shown in FIG. 5-A) of the outer insulating bushing, or through the width (shown in FIG. 5-A) of the outer insulating bushing, or less than the length and/or width. The amount of the oil passages 513 may be one, two, or more. The oil passages 513 may be placed symmetrically or asymmetrically.

It should be noted that the structures and materials of the winding, iron core and insulating bushing described above are merely illustrated for better understanding but not intent to limit the scope of the present disclosure. Various modifications to the disclosed embodiments will be readily apparent to those skilled in the art, and the general principles defined herein may be applied to other embodiments and applications without departing from the spirits and scope of the present disclosure. For example, the shape and size of the insulating bushing may be improved according to the principle of the transformer, such as drilling, trenching, or making irregular shapes. As another example, the spacer block may be replaced by a larger barrier, or be added an additional barrier and/or an insulating paper. As still another example, the materials of the bushing may be replaced by other materials which can meet the same demands. Such deformations are still within the scope of the present disclosure.

FIG. 6 is a schematic diagram depicting an exemplary structure of an installation of a high-voltage winding and a low-voltage winding according to some embodiments of the present disclosure. As shown in FIG. 6, a high-voltage part 610 of the transformer may be formed by burying the high-voltage winding into a printed circuit board (PCB) 611. The low-voltage winding and high-voltage winding, being passed through by the pillar of the iron core 411, may be combined with other attachments to form a transformer 600. In some embodiments, one or more layers of insulating paper layer(s) 620 may be added between the inner insulating bushing and the outer insulating bushing to enhance the insulativity between the high-voltage and low-voltage windings. In some embodiments, the PCB may be configured to enhance the insulativity between the high-voltage windings and interlayers while preventing creepage from the high-voltage winding to the ground. A through hole may be made on the PCB in order to let the iron core 411 pass through the inner insulating bushing. The size and shape of the through hole may match the size of the outer insulating bushing. The PCB with through holes may be installed on the outer insulating bushing according to a certain rule to support the winding of the high-voltage winding wires. The connection between the PCB and the outer insulating bushing may be either detachable or non-detachable. The detachable connection may include magnetic connection, threaded connection, pin connection, elastic deformation connection, lock connection, splice, or the like, or any combination thereof. The non-detachable connection may include welding (e.g., resistance welding or brazing), riveting, lamination, casting, cementation, or the like, or any combination thereof.

Figure 7:
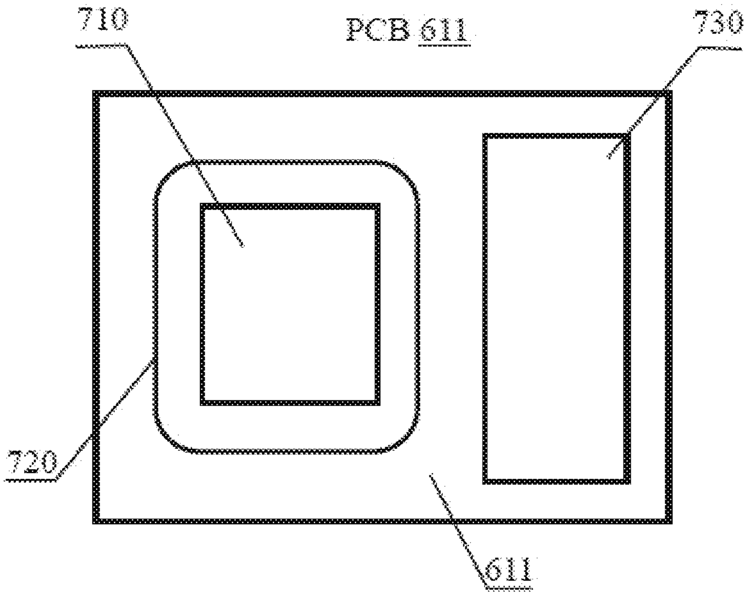
FIG. 7 is a schematic diagram depicting an exemplary print circuit board (PCB) in a high-voltage winding of a transformer of a high-voltage generator according to some embodiments of the present disclosure.

FIG. 7 is a schematic diagram depicting an exemplary print circuit board (PCB) in a high-voltage winding of a transformer of a high-voltage generator according to some embodiments of the present disclosure. For better understanding, a rectangular PCB and a rounded rectangular through hole 710 are selected in the present embodiment, and the through hole 710 may be located on one side of the PCB 611. In some embodiments, the shape of the PCB, the location and shape of the through hole may be varied according to different demands. As shown in FIG. 7, in some embodiments, a high-voltage winding 720 and a rectifier module 730 may be placed on the PCB 611. The wires of the high-voltage winding 720 may be coiled around the through hole 710.

The way of winding, the amount of layers, and turns of the high-voltage winding 720 on the PCB 611 may be determined according to the insulativity of the PCB and the value of the output voltage. The winding method of the high-voltage winding 720 may be concentric type or overlapping type. The concentric type of winding may include a cylindrical winding, a spiral winding, and a continuous winding. The type of cylindrical winding may include single layer, double layers, multi-layers, and subsection cylinder type, etc. The cycles of the high-voltage winding 720 may be determined by the requirements of the high voltage rating. For example, the higher the high voltage rating, the more of the cycles of the high-voltage winding 720. The winding shape of the high-voltage winding 720 may be a circle, a rectangle, a rounded rectangle, or other shapes.

In some embodiments, the high-voltage winding 720 may be made directly inside the PCB 611. Merely by way of example, the high-voltage winding 720 may be buried inside the PCB. The insulativity between the wires of the high-voltage winding 720 and the insulation between the high-voltage winding 720 and other components may be enhanced. In some embodiments, the high-voltage winding 720 may be bonded directly to the PCB 611, or be fixed in a groove of a certain depth dug at the corresponding bonding position. Obviously, to those skilled in the art, after understanding the basic principles of the characteristics of the PCB and the principles of the transformer, the forms and details of the PCB structure may be modified or varied without departing from the principles.

The rectifier module 730 may be an electronic component configured to transform an alternating voltage outputted from a high-voltage transformer into a direct voltage. As shown in FIG. 7, the rectifier module 730 may be set at the side of high-voltage winding 720 to supply an access for the high-voltage winding 720. The type of the rectifier module 730 may include a diode rectifier module, a silicon controlled rectifier module, a thyristor rectifier module, a bridge rectifier module, etc. The amount of rectifier modules may be one, two, or more. The rectifier module 730 may include a vacuum tube, an igniting tube, a solid state silicon semiconductor diode, a mercury arc, etc. The rectifier module 730 may be installed on the PCB after overall packaging, or its components may be inlayed on the PCB with a certain arrangement. The arrangement of the components is not limited herein, as long as it realizes the rectification function and meets the size requirement of the PCB. For example, the diodes of the rectifier module 730 may be arranged in one column according to some embodiments of the present disclosure.

It should be noted that the rectifier module 730 placed on the PCB as described above is merely an example of the present disclosure. In some embodiments, the rectifier module may be placed outside the PCB or outside the tank. In some embodiments, there may be no rectifier module.

The amount of the high-voltage winding 720 which the high-voltage part 610 in the transformer needs, may be increased or decreased according to the demand of the high voltage rating. The amount of the PCB 611 may be varied, such as one, two or more. In some embodiments when a large amount of PCBs are needed, the PCBs may be placed around the outer insulating bushing as a series of parallel planes to form a stack structure.

In some embodiments, the arrangement of the PCBs 611 in the PCB stack structure may be equally spaced, or unequally spaced. When the PCBs are arranged equally spaced, the spacing between the PCBs may depend on an insulation requirement, e.g., a voltage rating, a diameter of the wire of high-voltage winding, or a manufacturing condition. Mere by way of example, the distance may be, but is not limited to, 0.5~1.0 centimeter. When the PCBs are arranged unequally spaced, for example, in some embodiments, the spacing between the PCBs close to the bottom of the tank and close to the top of the tank may be different. The amount of PCBs may depend on the length of the outer insulating bushing, insulation requirements and the distance between PCBs. The shape of the PCBs may be a rectangle, a square, a circle, a rounded rectangle, or an irregular geometric shape. The PCB may be a single-sided board, a double-sided board, or a multi-layer board. The size and thickness may depend on the interior structure, placing, and size of the bushing inside the tank. In some embodiments, there may be a groove or a hole on the PCBs to accelerate the flow rate of the transformer oil and the heat dissipation of the tank.

In some embodiments, the material of the PCB may be phenolic paper, epoxy paper, polyester glass, epoxy glass, cotton, glass cloth, epoxy resin, polyols, polyester, or the like, or any combination thereof, or a composite of the above material and some other material. The other material herein may be a reinforcement phase, such as a fiber reinforcement phase, a particle reinforcement phase, a slice reinforcement phase, a lamination reinforcement phase, etc. For the fiber reinforced composite, it may include fiber reinforced plastics, a fiber reinforced rubber, a fiber reinforced ceramic, a fiber-reinforced metal, or the like, or any combination thereof. The fiber reinforcement phase may further include glass fiber, quartz fiber, carbon fiber, silicon carbide fiber, alumina fiber, boron fiber, boron nitride fiber, or the like, or any combination thereof. For the particle reinforcement composite, the reinforcement phase may further include metal particles, ceramic particles, metal particles dispersion strengthening, or the like, or any combination thereof. For example, the particle reinforcement phase may include silicon carbide particles, titanium carbide particles, boron carbide particles, alumina particles, silicon nitride particles, boron nitride particles, graphite particles, or the like, or any combination thereof. For the slice composite, the reinforcement phase may include graphite flakes, talc, mica powder, micaceous iron oxide, glass flakes, stainless steel flakes, non-ferrous metal flakes, non-ferrous metal oxide flakes, or the like, or any combination thereof. For the lamination composite, the type may be double lamination, three-layer lamination, crisscross lamination, or the like, or any combination thereof.

In some embodiments, the PCB 611 may be connected to the sampling board 430 in a certain way. The way of their connection may be detachable or non-detachable. The detachable connection may be a magnetic connection, a threaded connection, a pin connection, a connection of elastic deformation, a lock connection, a plug connection, or the like, or any combination thereof. The non-detachable connection may be welding (e.g., resistance welding or brazing), riveting, pressing, casting, cementing, or the like, or any combination thereof.

Figure 8:
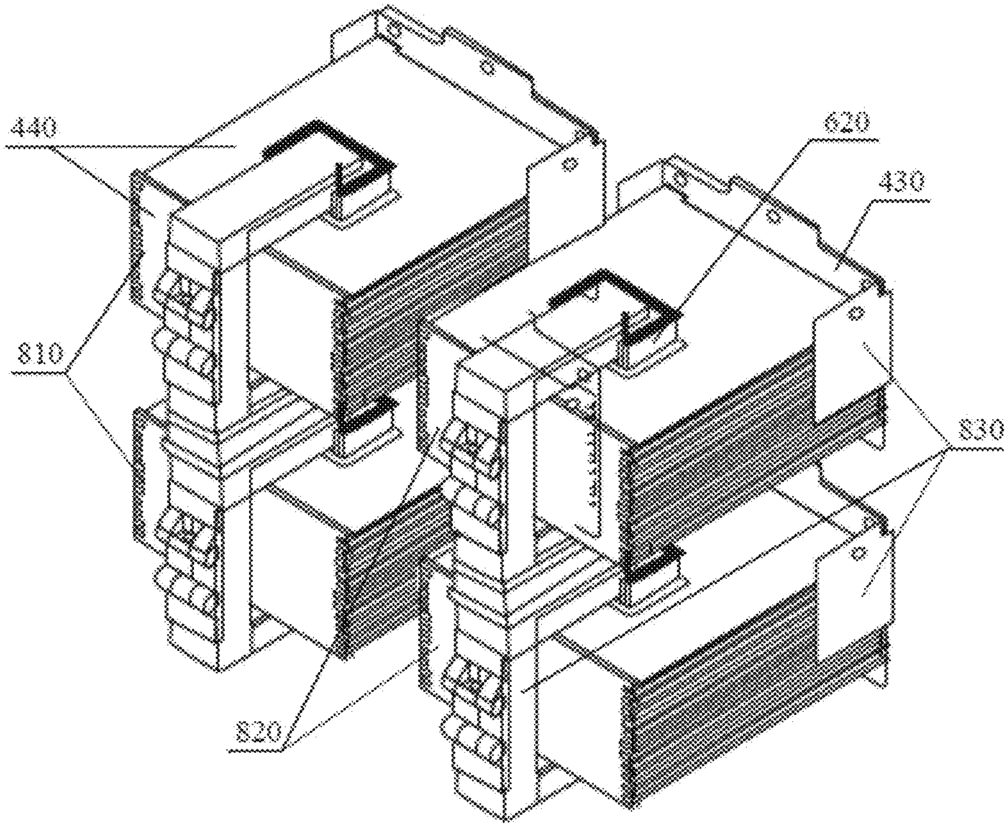
FIG. 8 is a schematic diagram (perspective view) depicting an exemplary transformer of a high-voltage generator according to some embodiments of the present disclosure.

In some embodiments, the transformer may either be used alone as a positive or negative transformer, or be grouped with other transformers according to the voltage rating requirements. FIG. 8 illustrates an embodiment of transformer groups of a high-voltage generator. As shown in FIG. 8, the transformer groups include a left group and a right group. Merely by way of example, the positive transformer 810 may be on one side, the negative transformer 820 may be on the other side, and vice versa. The two transformer groups may be connected with their corresponding high-voltage sockets, respectively. In some embodiments, each side of transformer group may include two transformers. The transformer group on each side may be stacked up and down in order to save space and reduce interference. The way that transformer group are placed may also be other types in other embodiments, as long as conforming to the principle of a transformer. It should be noted that FIG. 8 is merely an embodiment of the present disclosure. It is entirely possible for persons having ordinary skill in the art to make other variations and applications after understanding the corresponding principle. For example, the amount of positive transformers (and/or negative transformer) may be one, three, or more. As another example, the transformer groups may be placed symmetrically or unsymmetrically, e.g. the number on one side is different from that on the other side. Such variations of the structure or amount of the transformers are all within the scope of the present disclosure.

Some insulating measures such as an oil barrier 440 and/or an insulating paper layer 620 may be used in some embodiments in order to increase the insulativity between the transformers or between the transformer and the ground, as shown in FIG. 8. The oil barrier 440 and the insulating paper layer 620 may increase the insulativity effectively, and the oil barrier may further eliminate bridge breakdown effect. In some embodiments, as shown in FIG. 9, the oil barrier 440 may be placed on the upper and lower sides of the PCB stack structure, and/or the opposite sides of the sampling board in each transformer. Such placement may increase the insulativity between the transformers and between the transformer and the ground. In some embodiments, one or more layers of the insulating paper layer 620 may be added between the inner and the outer insulating bushing in order to increase the insulativity between the high-voltage and the low-voltage windings. In some embodiments, the left and right sides of the PCB stacked structure and the position where iron core contact with PCB board may also be coated with the insulating paper layer 620 to increase insulativity.

The insulating paper layer 620 may provide insulation, shielding, anti-interference, etc. In some embodiments, the insulating paper in the present disclosure may need to meet certain mechanical or electrical property (e.g. electric power resistance, dielectric loss, heat stability, etc.) requirements. The type of the insulating paper in the present disclosure may include traditional insulation paper, insulation crepe paper, Denison paper, Nomex paper, sized paper, semi-conductive cable paper, metalized crepe paper, metallized paper, insulating cardboard, corrugated cardboard, low dielectric coefficient cardboard, electrical laminated product, Nomex cardboard, glass fiber reinforced plastic board, 3721 phenolic cloth laminated rod, pull rod, electrical film, electrical composite material, varnished glass cloth, or the like, or any combination thereof. The traditional insulation paper may further include power cable paper, high-voltage cable paper, transformer turn-to-turn insulation paper, telephone paper, capacitor paper, wire-wrap paper, bakelite paper, or the like, or any combination thereof. The models of the Denison paper, which is also known as cyanide paper, may include 22HCC, 12HCC, 35HCC, 55HC, 510HC, or the like, or any combination thereof. The models of Nomex paper may further include 410 type, 411 type, 414 type, 418 type, 419 type, E56 type, H196 type, or the like, or any combination thereof. The sized paper may further include a single-side sized paper, double-side sized paper, Lingge sized paper, or the like, or any combination thereof. The semi-conductive cable paper may include monochrome semi-conductive cable paper, double color semi-conductive cable paper, etc. The models of the monochrome semi-conductive cable paper may further include 1BLZ-U, 1BLZ-A, etc., or the like, or any combination thereof. The models of the double color semi-conductive cable paper may include 2BLZ-U, 2BLZ-A, etc. The insulating cardboard may further include a low-density cardboard, a medium-density cardboard, a high-density cardboard, a hot pressing cardboard, a calendering cardboard, or the like, or any combination thereof. The corrugated cardboard may be either intermittent corrugated cardboard or continuous corrugated board, or both. The low dielectric coefficient cardboard may further include the cardboard which is made by blending poly methyl pentane fiber and wood fiber as raw material. The electrical laminated product may further include an insulating laminated board, an electrical laminated board, a phenolic laminated cardboard, a phenolic laminated cloth board, a laminated glass cloth board, or the like, or any combination thereof. The laminated glass cloth board may further include an epoxy glass cloth board, an organic silicon glass cloth board, a bismaleimide glass cloth board, a modified diphenyl oxide glass cloth board, a bismaleimide laminated glass cloth board, or the like, or any combination thereof. The model of the Nomex cardboard may further include 992 type, 993 type, 994 type, or the like, or any combination thereof. The levels of glass fiber reinforced plastic board may further include B, F, H, or the like, or any combination thereof. The electrical film and the electrical composite may further include a polypropylene film, a polyester film, a polyimide film, a polyester film polyester fiber nonwoven fabric soft composite (DMD), a polyester film aromatic polyamide fiber paper soft composite (NMN), a polyamide film aromatic polyamide fiber paper soft composite (NHN), or the like, or any combination thereof. The varnished glass cloth may further include a 2432 alkyd varnished glass cloth, an organic silicon varnished glass cloth, a polyimide varnished glass cloth, an oil paint silk, or the like, or any combination thereof.

As shown in FIG. 10-A, in some embodiments, the oil barrier 440 may also be used in other places within the tank aside from the interior of the high-voltage transformer group. In FIG. 10-A, a fixed bracket 1010 or other method of fixation may be used to fix structure(s) together within the tank. The oil barrier 440 used within the tank may be a solid insulating material with a certain shape and a certain size. In some embodiments, the usage of oil barrier may prevent bridge breakdown effect. In some other embodiments, the space charges gathered on one side of oil barrier may also make the electric field more uniform on the other side. The oil barrier used in the present disclosure may also be multilayered. Multilayer oil barrier may shorten the gap of transformer oil so that increase the breakdown electric field.

In some embodiments, the oil barrier 440 may be placed anywhere appropriate in the tank, e.g., inside the transformer, around the transformer, between the transformer and ground, between positive and negative transformers, or the like, or any combination thereof. In the embodiments of the oil barrier is within the transformer, the oil barrier may be placed on the upper and/or the lower side of the PCB stacked structure of transformer, or the position where the iron core contacts the PCB board (see FIG. 9). In the embodiments where the oil barrier is around the transformer, the oil barrier may be placed on the four surfaces (e.g., front, back, left and right surface) of the transformer module, or any one or more of these four surfaces (see FIG. 10-B). In the embodiments of the oil barrier is between the transformer and the ground, the oil barrier may be placed on a side close to the whole transformer module (see FIG. 10-B). The oil barrier may be placed between the positive and negative transformer in some embodiments.

In all the embodiments described above, the oil barrier 440 placed may be one layer, two layers in parallel or staggered, three layers, or more. For example, three layers of oil barriers may be placed between the positive and negative transformers. The oil barrier may be placed between the two targets, or somewhere special. In some embodiments, the oil barrier may be placed within the region about 10~30% apart from the positive transformer, e.g. 20%. The position may be adjusted according to different implementation scenarios. As shown in FIG. 10-B, when the oil barrier is set around the transformer, it may be placed on one surface of the transformer as a single piece, or be placed on one surface of transformer as several distributed pieces in parallel (see the oil barriers 440 arrayed in FIG. 11-A and FIG. 11-B), and the number and distance of the oil barriers may be varied in some embodiments. In some embodiments, a through hole 441 and/or a groove may be made in order to facilitate the flow of transformer oil and heat dissipation of the tank. The shape of the through hole 441 may be a circle, a rectangle, a rounded rectangle, or other shapes. The size, number, and distribution of the through hole 441 may be designed according to requirements of fluid dynamics, characteristics of the oil barrier, fluidity of transformer oil, and/or insulativity of the tank. Merely by way of example, the through hole 441 may be a circular hole with a diameter of 3~5 millimeters, or a square with side length of 3~5 millimeters. The through holes 441 may be distributed in the corners or in the center of the oil barrier, equally spaced, or designed according to the requirement of fluid dynamics. The amount of the through holes 441 on each piece of the oil barrier may be one, two, three, or more. In some embodiments, the shape, size, number, and position of different oil barriers in the tank may be chosen according to different requirements, rather than remaining consistent.

The material of the oil barrier 440 may be an insulating paper. The insulating paper may include traditional insulation paper, insulation crepe paper, Denison paper, Nomex paper, sized paper, semi-conductive cable paper, metalized crepe paper, metallized paper, insulating cardboard, corrugated cardboard, low dielectric coefficient cardboard, electrical laminated product, Nomex cardboard, glass fiber reinforced plastic board, 3721 phenolic cloth laminated rod, pull rod, electrical film, electrical composite material, varnished glass cloth, or the like, or any combination thereof. The traditional insulation paper may further include power cable paper, high-voltage cable paper, transformer turn-to-turn insulation paper, telephone paper, capacitor paper, wire-wrap paper, bakelite paper, or the like, or any combination thereof. The models of the Denison paper, which is also known as cyanide paper, may further include 22HCC, 12HCC, 35HCC, 55HC, 510HC, or the like, or any combination thereof. The model of the Nomex paper may further include 410 type, 411 type, 414 type, 418 type, 419 type, E56 type, H196 type, or the like, or any combination thereof. The sized paper may further include single-side sized paper, double-sided sized paper, Lingge sized paper, or the like, or any combination thereof. The semi-conductive cable paper may further include monochrome semi-conductive cable paper, double color semi-conductive cable paper, etc. The model of the monochrome semi-conductive cable paper may further include 1BLZ-U, 1BLZ-A, etc. The model of the double color semi-conductive cable paper may further include 2BLZ-U, 2BLZ-A, etc. The insulating cardboard may further include a low-density cardboard, a medium-density cardboard, a high-density cardboard, a hot pressing cardboard, a calendering cardboard, or the like, or any combination thereof. The corrugated cardboard may be either an intermittent corrugated cardboard or a continuous corrugated board, or both. The low dielectric coefficient cardboard may further include the cardboard which is made by blending a poly methyl pentane fiber and a wood fiber as raw materials. The electrical laminated product may further include an insulating laminated board, an electrical laminated board, a phenolic laminated cardboard, a phenolic laminated cloth board, a laminated glass cloth board, or the like, or any combination thereof. The laminated glass cloth board may further include an epoxy glass cloth board, an organic silicon glass cloth board, a bismaleimide glass cloth board, a modified diphenyl oxide glass cloth board, a bismaleimide laminated glass cloth board, or the like, or any combination thereof. The model of the Nomex cardboard may further include 992 type, 993 type, 994 type, or the like, or any combination thereof. The level of glass fiber reinforced plastic board may further include B, F, H, etc., or any combination thereof. The electrical film and the electrical composite material may further include a polypropylene film, a polyester film, a polyimide film, a polyester film polyester fiber nonwoven fabric soft composite (DMD), a polyester film aromatic polyamide fiber paper soft composite (NMN), a polyamide film aromatic polyamide fiber paper soft composite (NHN), or the like, or any combination thereof. The varnished glass cloth may further include a 2432 alkyd varnished glass cloth, an organic silicon varnished glass cloth, a polyimide varnished glass cloth, an oil paint silk, or the like, or any combination thereof.

The binding of components such as the windings, the iron core, the PCB, the transformer, transformer modules, or between the components, may choose a binding material 1110 in the present disclosure as shown in FIG. 11-A and FIG. 11-B. The binding material 1110 may need properties such as a certain tensile strength, heat resistance, softness, etc. In the present disclosure, the binding material may be an organic material, an inorganic material, or a composite. The organic material may include cotton tape, shrink tape, semi-dry dilute tape, glass cloth tape, polyester rope, glass fiber, or the like, or any combination thereof. For example, it may be tabby alkali-free glass tape, impregnated tabby binding tape, epoxy semi-dry dilute weft tape, resin impregnated glass fiber weftless binding tape, electrician white cloth tape, electrician shrink tape, or the like, or any combination thereof. The inorganic material may be a metal or metal alloy, such as a stainless steel binding tape, etc. The binding tapes described above may be chosen according to specific implementation scenarios, and is not limiting.

There may be a leak risk of the transformer oil caused by a volume change due to its thermal expansion and contraction during the usage of the high-voltage generator. In addition, the volume change of the transformer oil may also result in bubbles within. The existence of bubbles may lower breakdown voltage, and damage insulativity and arc prevention property of the transformer oil, thereby reducing the stability of the high-voltage generator. In order to eliminate the danger from the transformer oil volume change, a device having a function of buffering or compensating for volume changes may be put into the oil tank, for example, an oil conservator. The type of the oil conservator may include a bellows, a diaphragm, and a capsule. For illustration purposes, the bellows type oil conservator may be described as an example in the present disclosure.

FIG. 12-A illustrates an exemplary structure of an embodiment of a bellows in the tank of a high-voltage generator according to some embodiments of the present disclosure. The bellows 450 may be put on the opening 315 of the tank (see FIG. 4-A). The bellows 450 may include a bellows body 1210 with openings at its two ends. A bottom lid 1220 is set at the bottom end of bellows body 1210. The bottom lid 1220 may be fixed and connected with the bellows body 1210 in a detachable or non-detachable way, to achieve sealing of the bottom of bellows body 1210. An upper lid 1230 may be fixed and connected with the bellows body 1210 in a detachable or non-detachable way. A through hole 1231 may be set on the upper end cover 1230, so that the bellows body 1210 opens at one end.

In some embodiments, there may be a mounting hole 1232 on the upper lid 1230. When used, the through hole 1231 on the upper lid 1230 may correspond to the position of the opening 315 of the tank 300. The upper face of upper lid 1230 may fit against on the inner wall of the tank 300, and is fixed and connected with the tank 300 through screws inside the mounting hole 1232. In some embodiments, the mounting holes 1232 may be distributed uniformly around the through hole 1231 on the upper lid 1230 to improve the strength and stability of the connection between the bellows body 1210 and the tank 300. The mounting hole 1232 may have a structure of screw hole which may be sealed at the bottom, or other detachable or non-detachable connection structures. The structure of the mounting holes 1232 is merely for illustration purposes but not limited within the scope of the present disclosure.

In some embodiments, a seal ring (not shown in the figure) may be set on the connection face between the upper lid 1230 and the tank 300, and the seal ring may surrounded the opening 315 of the tank 300. The seal ring may be configured to improve the sealing performance between the inner wall of the tank 300 and the bellows 450, to avoid leakage of the transformer oil in the tank 300. Alternatively, a circular groove 1233 around the through hole 1231 may be set on the upper surface of the upper lid 1230. The circular groove 1233 may be configured to install the seal ring to improve installation stability of the seal ring.

The bellows may be placed inside or outside the tank. The bellows may be placed vertically or horizontally. The structure of the bellows may be single-layered or multi-layered. The amount of the bellows may be one, two, or more. When the amount of the bellows is more than one, they may have their own openings on the tank lid, or share one same opening. The position of the bellows may be designed according to fluid dynamics or other factors. For example, the bellows may be installed on the center of the tank lid or offset to one side of the transformer. The size of the bellows may be designed according to the size of the tank, the volume and liquidity of the transformer oil, etc. For example, a bigger bellows or several smaller bellows may be chosen when the tank is big. The waveform of the bellows may be U-shaped, V-shaped, Q-shaped, C-shaped, S-shaped, flat plate type, ladder flat type, single wave type, wrinkle type, or the like, or any combination thereof. The cross-section of the bellows may be a circle, a square, an oval, a trapezoid, or other special shapes. The material of the bellows may be a metal, an organic material, an inorganic material, or the like, or any combination thereof. The metal may include stainless steel, carbon steel, aluminum, bronze, brass, titanium, Hastelloy, or the like, or any combination thereof. The organics may include rubber, plastics, Teflon, or the like, or any combination thereof. The inorganics may include carbon fiber.

The factors such as the position, number, size, shape, material, may meet the standards of some countries or institutions. The standards may include GB/T 12777 General Technical Conditions of Metal Bellows Expansion Joint of China, GB16749 Pressure Vessel Waveform Expansion Joint, Expansion Joint Manufacturers Association (EJMA) Standards of America, Pressure Vessels and Heat Exchangers Expansion Joints which is section VIII, Annex 26 volume I of Boiler and Pressure Vessel Code (BPVC) of American Society of Mechanical Engineers (ASME), BS 6129 first section of Metal Bellows Expansion Joints of British, AD pressure vessel code B13 Single-layer Bellows Expansion Joints of Germany, chapter CODAP C Waveform Expansion Joint Design Rules of France, JIS B 2352 Bellows Expansion Joints of Japan, etc. What are also included may be the product standards recommended by the companies such as MWKL of United States, TOYO of Japan, Teddington of the United Kingdom or HYDRA of Germany, etc.

In some embodiments, a guide structure may be provided on the bellows. The guide structure may be configured to guide movement of the bellows along its axial direction. In some embodiments, the guide structure may contribute to maintaining the stability of the bellows in the tank during the movement such as rotation in the process of usage of high-voltage generator.

FIG. 12-B is a sectional view along the A-A direction of the bellows 450, which shows an exemplary guide structure 1240. In some embodiments, the guide structure 1240 may include a guide casing 1241 and a guide rod 1242. The guide casing 1241 may be a tubular structure opened at both ends. One end of the guide casing 1241 may be fixed on the opening end of the bellows, and the other end may include an opening 1243. The upper face of the guide casing 1241 may be fixed around the through hole 1231 on the upper lid 1230, so the interior of the guide casing 1241 may be interlinked with the external of the tank 300.

One end of the guide rod 1242 may be fixed on the closed end of the bellows, the other end may insert into the guide casing 1241 through the opening 1243. A bump 1244 may be set on the upper end of the guide casing 1241, and the size of the bump may be slightly larger than the opening 1243 of guide casing 1241 to avoid shifting out of the guide rod 1242. The gap width between the bottom opening of the guide casing 1241 and the guide rod 1242 may be determined according to the requirements such as moving flexibility and position fixity, e.g. within a certain threshold of range, such as less than or equal to 2 millimeters.

FIG. 13 is another exemplary guide structure 1310 in the bellows. The bellows may only include a guide rod 1311. The axial direction of the guide rod 1311 may stretch along the axial direction of the bellows body 1210. A bottom end 1312 of the guide rod 1311 may be fixed at the blind end of the bellows. An upper end 1313 of the guide rod 1311 may stretch from the opening of the tank 300 to outside of the tank 300. A through hole 1231 of the upper lid 1230 may act as a limit hole to limit the movement of the guide rod 1311. There may be a bump 1314 at the upper end of the guide rod 1311, and the bump may be bigger than the through hole 1231 to prevent the guide rod 1311 stretching into the internal of bellows body 1210. The width of the gap between the through hole 1231 and the guide rod 1311 may be determined according to the moving mobility and the location fixity of the guide rod. For example, the gap may be within a certain threshold of no more than 2 millimeters. The bottom end 1312 of the guide rod 1311 may be connected to the bottom lid 1220 of the bellows in a detachable or a non-detachable way. The detachable way may include magnetic connection, threaded connection, pin connection, elastic deformation connection, lock connection, splice, or the like, or any combination thereof. The non-detachable way may include welding (e.g., resistance welding or brazing), riveting, lamination, casting, cementation, or the like, or any combination thereof.

The guide structure 1310 may further include a substrate 1315 with an internal threaded hole 1316 set on the bottom lid 1220. There may be an external thread of the threaded hole 1316 at the bottom end 1312 of the guide rod 1311 to fix the bottom end 1312 to the bottom lid 1220.

It should be noted that the guide structure 1310 described above is merely an embodiment of the present disclosure. It is entirely possible for persons having ordinary skill in the art to make other variations and applications after understanding the corresponding principle. For example, there may be more than one guide structure in a bellows. As another example, the guide structure may be other structures. As still another example, other ancillary structures may be installed on the guide structure, such as an exhaust pipe or a drainage pipe. Such extensions and deformations of the structure are all within the scope of the present disclosure.

Having thus described the basic concepts, it may be rather apparent to those skilled in the art that the foregoing detailed disclosure is intended to be presented merely by way of example and is not limiting. Various alterations, improvements, and modifications may occur and are intended to those skilled in the art, though not expressly stated herein. For example, the ways of increasing the internal insulation may be used alone, or any combination thereof. As another example, some of the ways of increasing the internal insulation may be used in combination, and others may be deformed. These alterations, improvements, and modifications are intended to be suggested by the present disclosure, and are within the scope of the present disclosure.

For better understanding of the present disclosure, some embodiments of an insulation device and a method of a high-voltage generator tank will be described in detail below. It should be noted that the embodiments below are not intended to limit the scope of the present disclosure.

Embodiment 1

A tank of a high-voltage generator may include a tank body and a tank lid. The tank lid may include an opening corresponding to a bellows and other necessary components. The tank body may contain transformer oil in which a positive transformer, a negative transformer, a filament transformer, an oil barrier, a bellows, a sampling board, and other necessary components may be immersed.

The positive transformer (and/or the negative transformer) may include an inner insulating bushing, an outer insulating bushing, a low-voltage winding, a high-voltage winding, and an iron core. The inner insulating bushing may be embedded in the outer insulating bushing. The iron pillar of the iron core may go through the inner insulating bushing to fix the high-voltage and the low-voltage windings together. The low-voltage winding may be wound around the inner insulating bushing and the high-voltage wingding may be wound around the PCBs. There may be a gap between the inner and the outer insulating bushings. An insulating paper layer and/or a fixture may be placed in the gap. There may be an opening in which a lead may be placed in the inner and the outer insulating bushings. The shape of the cross-section of the inner and the outer insulating bushings may be a circle, a rectangle, a rounded rectangle, or the like. The material of the inner and the outer insulating bushings may be a single material or a composite material. The composite material may be a composite of polycarbonate (PC) and glass fiber, and the glass fiber may be used as a reinforcement phase.

A series of PCBs may cover around the outer insulating bushing of the transformer. There may be a through hole in the insulating PCBs. The through hole may be used to allow the outer insulating bushing to go through. The PCBs may be stacked in an equal distance and there may be a groove between two adjacent PCBs. The heights of the grooves may be equal and the grooves may be around the outer insulating bushing. The high-voltage winding may be wound around the PCBs. The different turns of the high-voltage winding may be separated by the grooves so that the insulativity between the turns may be improved. In addition, a rectifier module may be placed on the PCBs so that an alternating current outputted from the high-voltage winding may be transformed into a direct current. Further, some oil barriers may be placed on the upper and the lower surfaces of the stack structure of the PCBs.

The oil barrier may improve insulativity and eliminate the bridge breakdown effect. It may be placed, for example, on the upper and the lower surfaces of the stack structure of the PCBs of the positive transformer (and/or the negative transformer), between the positive and the negative transformers, between the ground and the positive transformer (and/or the negative transformer), and between the transformer and the tank body. For example, in the case of placing the oil barriers between the positive and the negative transformers, the oil barrier may be placed within the region about 10~30% apart from the positive transformer. The amount of oil barriers may be two or more. In the case of placing the oil barriers between the positive transformer (and/or the negative transformer) and the ground, the oil barrier may be placed within the scope region of about 10~30% apart from the positive transformer (and/or the negative transformer). There may be through holes with a diameter of, for example, 3~5 millimeters, on the oil barriers so as to improve the fluidity of the transformer oil.

The bellows of the tank may be mounted on the tank lid. One end of the bellows may be provided with an opening, and the other end may be a closed structure. The opening of the bellows may be aligned with the opening of the tank lid when installing the bellows. The bellows may include a guide structure. The guide structure may include a guide rod and a guide casing. One end of the guide rod, which is close to the opening of the bellows, may be located within the guide casing. The other end may be connected to the bellows in a detachable or non-detachable way. When the tank is working, the volume change of the transformer oil may be compensated by the volume variation of the bellows.

Embodiment 2

A tank of a high-voltage generator may include a tank body and a tank lid. The tank body may contain transformer oil in which a positive transformer, a negative transformer, a filament transformer, an oil barrier, a bellows, a sampling board, and other necessary components may be immersed.

The positive transformer (and/or the negative transformer) may include an inner insulating bushing, an outer insulating bushing, a low-voltage winding, a high-voltage winding, and an iron core. The inside insulating bushing may be embedded in the outer insulating bushing. The iron pillar of the iron core may go through the inner insulating bushing to fix the high-voltage and the low-voltage windings together. The low-voltage winding may be wound around the inner insulating bushing and the high-voltage wingding may be wound around the PCBs. There may be a gap between the inner and the outer insulating bushings. An insulating paper and/or a fixture may be placed in the gap. There may be an opening in which a lead may be placed in the inner and the outer insulating bushings. The shape of the cross-section of the inner and the outer insulating bushings may be a circle, or a rectangle, or the like. The material of the inner and the outer insulating bushings may be a single material or a composite material. The composite material may be a composite of polycarbonate (PC) and glass fiber, and the glass fiber may be a reinforcement phase.

A series of PCBs may be placed around the outer insulating bushing of the transformer. There may be a through hole in the insulating PCBs. The through hole may be configured to allow the outer insulating bushing to go through. The PCBs may be stacked with an equal spacing, forming equal spaced grooves between two adjacent PCBs. The high-voltage winding may be wound around the PCBs. The different turns of the high-voltage winding may be separated by the grooves so that the insulativity between the turns may be improved. In addition, a rectifier module may be placed on the PCBs so that an alternating current outputted from the high-voltage winding may be transformed into a direct current. Further, some oil barriers may be placed on the upper and the lower surfaces of the stack structure of the PCBs.

The oil barrier may improve insulativity and eliminate the bridge breakdown effect. It may be placed, for example, on the upper and the lower surfaces of the stack structure of the PCBs of the positive transformer (and/or the negative transformer), between the positive and the negative transformers, between the ground and the positive transformer (and/or the negative transformer), and between the transformer and the tank body. For example, in the case of placing the oil barriers between the positive and the negative transformers, the oil barrier may be placed within the region about 10~30% (e.g., 20%) apart from the positive transformer (and/or the negative transformer). The amount of oil barriers may be two or more. In the case of placing the oil barriers between the positive transformer (and/or the negative transformer) and the ground, the oil barrier may be placed within the region about 10~30% (e.g., 20%) apart from the positive transformer (and/or the negative transformer). There may be through holes, with a diameter of 3~5 millimeters, on all of the oil barriers so as to improve the fluidity of the transformer oil.

Embodiment 3

A transformer of an X-ray high-voltage generator that may include a positive transformer and a negative transformer. The positive transformer (and/or the negative transformer) may include a high-voltage winding, a low-voltage winding, and an iron core. The high-voltage wingding may surround the low-voltage winding. The iron core may go through the low-voltage winding.

The low-voltage winding may be wound around the inner insulating bushing and the high-voltage winding may be wound around the PCBs. The outer insulating bushing may be wound around outside the inner insulating bushing. The winding may be of a concentric type or an interleaved type. In this embodiment, the winding may be a concentric type. The concentric type may further include a cylinder type, a spiral type, and a successive type. In this embodiment, the cylinder type may be chosen. The cylinder type may further include a monolayer type, a bilayer type, a multilayer type, and a section type. In the embodiment, the multilayer type may be chosen. Thus the winding method may be the concentric-cylinder-multilayer type. The method of winding may vary and is not limited here.

The shape, size, material, and structure of the inner and the outer insulating bushings may be chosen according to different implementation scenarios. For example, the cross section of the inner insulating bushing (and/or the outer insulating bushing) may be a circle, a rectangle, or a rounded rectangle. The material of the inner insulating bushing (and/or the outer insulating bushing) may be gummed paper, oiled paper, or the like. The material may also be a composite of some organic materials and inorganic materials. The organic material may include tetrafluoroethylene, nylon, polycarbonate (PC), or the like, or any combination thereof. The inorganic material may include glass fiber, boron fiber, carbon fiber, silicon carbide fiber, silica fiber, alumina fiber, silicon nitride fiber, or the like, or any combination thereof. In the embodiment, the material of the inner insulating bushing (and/or the outer insulating bushing) may be a composite of polycarbonate (PC) and glass fiber.

There may be an opening on the side of the inner insulating bushing so as to allow the lead of the low-voltage winding to go through. There may be some small oil passages 513 on the outer insulating bushing to allow the transformer oil to flow past and improve the insulativity of the inner insulating bushing. There may be a heat dissipation channel between the inner and the outer insulating bushings. There may be a fixture in the heat dissipation channel so as to prevent the inner and the outer insulating bushings from moving relatively. The fixture may be a spacer block. The shape of the fixture may be a cube, a cuboid, a cylinder, a sphere, a board, or the like. The fixture may extend throughout or be a part of the length of the inner and the outer insulating bushings. The amount of the fixture may be one or more. Supposing that there are several fixtures, the fixtures may be arranged with equal or unequal spacing. The material of the fixture may be the same as that of the inner and the outer insulating bushings. Alternatively, the material of the fixture may be chosen from a material with insulativity and supporting property similar to that of the inner and the outer insulating bushings.

Embodiment 4

A transformer of an X-ray high-voltage generator that may include a positive transformer and a negative transformer. The positive transformer (and/or the negative transformer) may include a high-voltage winding, a low-voltage winding, and an iron core. The high-voltage wingding may surround the low-voltage winding and the iron core may go through the low-voltage winding, forming a transformer.

The high-voltage winding of the transformer may be embedded in the PCBs. On one hand, the PCB may improve the insulativity between the turns and between layers of the high-voltage winding. On the other hand, the PCB may prevent creepage from the high-voltage winding to the ground. There may be a through hole in the PCBs so as to allow the iron core and the inner insulating bushing to go through. The size and shape of the through hole may match those of the outer insulating bushing. The PCBs with the through hole are stacked around the outer insulating bushing and a groove may be formed by two adjacent PCBs. The PCBs are parallel to each other with a certain spacing in between, forming grooves. The high-voltage winding may be wound in the groove. The connection between the PCBs and the outer insulating bushing may be detachable or non-detachable. The detachable connection may include magnetic connection, threaded connection, pin connection, elastic-deformation connection, hasp connection, socket connection, or the like, or any combination thereof. The non-detachable connection may include welding (e.g., electric resistance welding or soldering and brazing), riveting, press fit, casting, adhesive bond, or the like, or any combination thereof. In addition, a rectifier module may be placed on the PCBs so that an alternating current outputted from the high-voltage windings may be transformed into a direct current.

The winding method and the numbers of turns and layers of the high-voltage winding may depend on the insulativity of the PCB and the value of the output voltage. The PCBs may be arranged with equal or unequal spacing. When the PCBs are arranged with equal spacing, the spacing may depend on an insulation requirement, a voltage rating, a diameter of the wire of high-voltage winding, and/or a manufacturing conditions. For example, the spacing may be 0.5~1.0 centimeter. However, the distance is not limited to this range. When the PCBs are arranged with unequal spacing, for example, the spacing between the PCBs closed to the bottom of the tank may be more or less than those between the PCBs closed to the top of the tank. The amount of PCBs may depend on the length of the outer insulating bushing, an insulation requirement, and the spacing between PCBs. The shape of PCBs may be a rectangle, a square, a circle, a rounded rectangle, or an irregular geometric shape. The PCB may be a single-sided board, a double-sided board, or a multi-layer board. The size and thickness may depend on an interior structure, a placement, and the size of the bushing of the tank. Further, there may be grooves and holes on the PCBs so as to allow the transformer oil to flow past and heat dissipation. The material of PCBs may be phenolic paper, epoxy paper, polyester glass, epoxy glass, cotton, glass cloth, epoxy resin, polyhydric alcohols, polyester, or the like, or any combination thereof.

Embodiment 5

A transformer of an X-ray high-voltage generator that may include a positive transformer and a negative transformer. The positive transformer (and/or the negative transformer) may include a high-voltage winding, a low-voltage winding, and an iron core. The high-voltage wingding may cover around the low-voltage winding and the iron core may go through the low-voltage winding, which may form a transformer.

The high-voltage winding of the transformer may be embedded in the PCBs. There may be a through hole in the PCB so as to allow the iron core and the inner insulating bushing to go through. The size and shape of the through hole may match those of the outer insulating bushing. The PCBs with the through hole may be stacked around the outer insulating bushing and with a certain spacing in between them to form a groove. The connection between the PCBs and the outer insulating bushing may be detachable or non-detachable. The detachable connection may include magnetic connection, threaded connection, pin connection, elastic-deformation connection, hasp connection, socket connection, or the like, or any combination thereof. The non-detachable connection may include welding (e.g., electric resistance welding or soldering and brazing), riveting, press fit, casting, adhesive bond, or the like, or any combination thereof. In addition, a rectifier module may be placed on the PCB so that an alternating current outputted from the high-voltage winding may be transformed into a direct current.

The winding method and the numbers of turns and layers of the high-voltage winding may depend on the insulativity of PCB and the value of output voltage. The PCBs may be arranged with equal or unequal spacing. The amount of PCBs may depend on the length of the outer insulating bushing, insulation requirement and the spacing between PCBs. The shape of PCBs may be a rectangle, a square, a circle, a rounded rectangle, or an irregular geometric shape. The PCB may be a single-sided board, a double-sided board, or a multi-layer board. The size and thickness may depend on interior structure, placement, and size of the bushing of the tank. Further, there may be grooves and holes on the PCBs so as to allow the transformer oil to flow past and heat dissipation. The material of PCBs may be phenolic paper, epoxy paper, polyester glass, epoxy glass, cotton, glass cloth, epoxy resin, polyhydric alcohols, polyester, or the like, or any combination thereof.

An oil barrier and/or an insulating paper layer may be used to improve the insulativity between the transformers and between the transformer and the ground. For example, the oil barriers may be placed on the upper and the lower surfaces of the stack structure of PCBs or the opposite side of the sampling board, to improve insulativity between the transformers and the insulativity between the transformers and the ground. One or more layers of the insulating paper may be placed between the inner and the outer insulating bushings so as to improve the insulativity between the high-voltage and the low-voltage windings. In addition, the right/left sides of the PCBs and parts of the iron core which the PCBs are in contact with may also be covered by the insulating paper layer so as to improve the insulativity.

Embodiment 6

A tank of a high-voltage generator may contain transformer oil in which a positive transformer, a negative transformer, a filament transformer, an oil barrier, a sampling board, and other components may be immersed.

The oil barrier may be placed in the tank so as to improve insulativity and eliminate the bridge breakdown effect. It may be placed, for example, on the upper and the lower surfaces of the stack structure of PCBs of the positive transformer (and/or the negative transformer), between the positive and the negative transformers, between the ground and the positive transformer (and/or the negative transformer), and between the transformer and the tank body.

The oil barrier may be placed on the upper and the lower surfaces of the stack structure of PCBs of the positive transformer (and/or the negative transformer), which may improve the insulativity between the transformers and the insulativity between the transformers and the ground. In addition, the oil barrier may be placed on the parts of the iron core which the PCBs are in contact with so as to improve the insulativity between the high-voltage winding and the iron core. The oil barrier may be placed between the tank body and at least one side of the transformer so as to improve the insulativity between the transformer and the tank body.

The oil barrier may be placed between the positive and the negative transformers, or between the transformers and the ground so as to improve insulativity. For example, in the case of placing the oil barrier between the positive and the negative transformers, the oil barrier may be placed within the region about 10~30% apart from the transformer. The amount of oil barriers may be two or more. In the case of placing the oil barrier between the positive transformer (and/or the negative transformer) and the ground, the oil barrier may be placed within the region about 10~30% apart from the positive transformer (and/or the negative transformer). The location, shape, and amount of the oil barrier may depend on different implementation scenarios. There may be through holes in the oil barriers so as to improve the fluidity and heat dissipation of the transformer oil. The shape, size, number, and location of the through hole may depend on fluid dynamics, characteristics of the oil barrier, fluidity of the transformer oil, insulativity of the tank, and other specific requirements. For example, the diameter of the through hole may be 3~5 millimeters, or the shape of the oil barrier may be a cuboid whose side length is 3~5 millimeters. The amount of the oil barriers may be one, two, three, or more. There may be no limitation of the location of through holes. In this embodiment, the shape, size, number, and location of the oil barriers in the same tank may be different locations according to different implementation scenarios, and does not have to be the same as described above.

Embodiment 7

A tank of a high-voltage generator may include a tank body and a tank lid. The tank lid may include an opening corresponding to a bellows and other components. The tank body may contain transformer oil, and include a bellows, and other necessary components. The bellows may be mounted on the tank lid.

One end of the bellows may be provided with an opening, and the other end may be a closed structure. The opening of the bellows may be aligned with an opening of the tank lid so that the inside of the bellows may be connected to the outside atmosphere. The bellows may be fixed to the inside wall of the tank. The bellows and inside walls of the tank may form a sealed space. The tank may be full of transformer oil, and the volume of the transformer oil may vary because of thermal expansion. The bellows may extend or shorten in a telescopic manner based on the pressure inside the tank. The volume change of the transformer oil may be compensated by the volume variation of the bellows, so that the generation of bubbles in the transformer oil may be avoided, which may improve the stability of the high-voltage generator.

The bellows may include a bellows body with openings at both ends. The bottom of the bellows body may be sealed by a bottom lid. There may be mounting holes on the upper lid of the bellows so that the bellows may be fixed to the inside wall of the tank with screws. In addition, there may be a sealing ring in the connection face of the bellows and the tank so as to improve sealing and avoid oil leak.

The bellows may include a guide structure. The guide structure may include a guide rod and a guide casing. The guide structure may be used to guide movement of the bellows along its axial direction. One end of the guide rod that is close to the opening of the bellows may be located within the guide casing. The other end may be connected to the bottom lid of the bellows in a detachable or a non-detachable way. The part of the guide rod, which is located within the guide casing, may move axially along the bellows to lead the bellows to shorten or to extend regularly. It may prevent the bellows from bending or twisting, and avoid the impact between the bellows and the inside walls of the tank. When the tank is working, the volume change of the transformer oil may be compensated by the volume variation of the bellows. The guide casing may be a tubular structure opened at both ends. The top end of the guide casing may be fixed to the upper lid. An opening on the top of the guide casing may be aligned with an opening the upper lid of the bellows. The opening of the upper lid may be surrounded by the top end of the guide casing so that the inside of the guide casing may be connected to the atmosphere outside the tank.

In some embodiments, there may be a bump on the top end of the guide rod. The bump may be larger than the opening on the bottom of the guide casing to prevent the guide rod from moving out of the guide casing. Further, the width of a gap between the opening on the bottom of the guide casing and the guide rod may be equal to that between the bump and the inside walls of the guide casing to improve the stability when the guide rod is moving in the guide casing. The width of the gap between the opening on the bottom of the guide casing and the guide rod may be less than or equal to 2 millimeters, for example, 1 millimeter.

Embodiment 8

A tank of a high-voltage generator may include a tank body and a tank lid. The tank lid may include an opening corresponding to a bellows and other components. The tank body may contain transformer oil, and include a bellows, and other necessary components. The bellows may be mounted on the tank lid.

One end of the bellows may be provided with an opening, and the other end is a closed structure. When mounting the bellows, the opening of the bellows may be aligned with an opening of the tank lid so that the inside of the bellows may be connected to the outside atmosphere. The bellows may be fixed to the inside wall of the tank. The bellows and inside walls may form a sealed space. The tank may be full of transformer oil, and the volume of the transformer oil may vary because of thermal expansion. The bellows may extend or shorten in a telescopic manner based on the pressure inside the tank. The volume change of the transformer oil may be compensated by the volume variation of the bellows so that the generation of bubbles in the transformer oil may be avoided, which may improve the stability of the high-voltage generator.

The bellows may include a bellows body with openings at both ends. The bottom of the bellows body may be sealed by a bottom lid. There may be mounting holes in the upper lid of the bellows so that the bellows may be fixed to the inside wall of the tank with screws. In addition, there may be a sealing ring in the connection face of the bellows and the tank so as to improve sealing and avoid oil leak.

The bellows may include a guide structure. The guide structure may include a guide rod. The guide structure may be used to guide movement of the bellows along its axial direction. One end of the guide rod that is close to the opening of the bellows may protrude from the bellows. The other end may be connected to the bellows in a detachable or a non-detachable way. The bottom end of the guide rod may be connected to the closed structure of the bellows and the top end protrudes from the opening of the tank lid to the atmosphere outside the tank. The bottom end of the guide rod may be fixed to the bottom lid of the bellows. The top end protrudes from the opening of the upper lid of the bellows to the outside atmosphere. The opening may be used to restrict the movement of the guide rod. The guide rod may go through the opening and move axially along the bellows to lead the bellows to shorten or to extend regularly. It may prevent the bellows from bending or twisting, and avoid the impact between the bellows and the inside walls of the tank. When the tank is working, the volume change of the transformer oil may be compensated by the volume variation of the bellows.

In some embodiments, the width of a gap between the opening on the bottom of the guide casing and the guide rod may be less than or equal to 2 millimeters, for example, 1 millimeter. There may be a bump on the top of the guide rod. The bump may be larger than the opening on the bottom of the guide casing to prevent the guide rod from moving out of the guide casing.

In some embodiments, the guide structure may also include a substrate placed on the bottom of the bellows. The substrate may be provided with an internal threaded hole. The bottom of the guide rod may be provided with external threads which match the internal threaded hole of the substrate so that the bottom of the guide rod may be fixed to the bottom lid of the bellows.

What is claimed is:

1. A transformer for a high-voltage generator tank, comprising:

an inner insulating bushing;

an outer insulating bushing, the inner insulating bushing being inside the outer insulating bushing;

a low-voltage winding wound on the inner insulating bushing; and an iron core going through the inner insulating bushing, wherein the transformer further comprises more than one printed circuit board (PCB) outside the outer insulating bushing, the more than one PCB being configured in a stack structure, the transformer further comprises one or more oil barriers set in at least one of following positions:

a position on upper and/or lower surfaces of the stack structure of the more than one PCB;

a position between the transformer and the ground; or a position between the transformer and the tank.

2. The transformer of claim 1, wherein the more than one PCB comprises a rectifier block.

3. The transformer of claim 1, wherein the transformer further comprises a sampling board.

4. The transformer of claim 3, wherein one end of the stack structure of the more than one PCB is connected with one of the one or more oil barriers; and the other end is connected with the sampling board.

5. The transformer of claim 1, wherein the one or more oil barriers are configured as a single piece or an oil barrier array.

6. The transformer of claim 5, wherein the oil barrier array is arranged in a side-to-side manner or a front-to-back manner.

7. The transformer of claim 1, wherein one of the one or more oil barriers comprises a through hole.

8. The transformer of claim 1, wherein the transformer further comprises a high-voltage winding, wherein the high-voltage winding is wound on the more than one PCB.

9. The transformer of claim 1, wherein the transformer further comprises a high-voltage winding, wherein the high-voltage winding is buried inside the more than one PCB.

10. The transformer of claim 1, wherein at least one oil passage is formed on the outer insulating bushing to allow oil in the high-voltage generator tank to flow through, a cross-section of one of the at least one oil passage includes a circle, a rectangle, or a rounded rectangle, at least one of the at least one oil passage extends throughout a length of the outer insulating busing, or the at least one of the at least one oil passage extends throughout a width of the outer insulating busing.

11. The transformer of claim 10, wherein the at least one oil passage leads the oil into the outer insulating busing such that an insulativity or a breakdown voltage of the outer insulating busing are increased.

12. The transformer of claim 10, wherein a conducting direction of the oil in the at least one oil passage is parallel to an axis of the outer insulating bushing.

13. The transformer of claim 10, wherein a conducting direction of the oil in the at least one oil passage is parallel to a cross-section of the outer insulating bushing.

14. The transformer of claim 10, wherein for the at least one of the at least one oil passage, a width of the oil passage is less than the width of the outer insulating busing; or a length of the oil passage is less than the length of the outer insulating busing.

15. The transformer of claim 10, wherein the at least one oil passage is placed symmetrically.

* * * * *